US007657038B2

(12) United States Patent
Doclo et al.

(10) Patent No.: US 7,657,038 B2
(45) Date of Patent: Feb. 2, 2010

(54) METHOD AND DEVICE FOR NOISE REDUCTION

(75) Inventors: Simon Doclo, Schilde (BE); Ann Spriet, Bertem (BE); Marc Moonen, Herent/Winksele (BE); Jan Wouters, Holsbeek (BE)

(73) Assignee: Cochlear Limited, Lane Cove (AU)

( * ) Notice: Subject to any disclaimer, the term of this patent is extended or adjusted under 35 U.S.C. 154(b) by 32 days.

(21) Appl. No.: 10/564,182

(22) PCT Filed: Jul. 12, 2004

(86) PCT No.: PCT/BE2004/000103

§ 371 (c)(1),
(2), (4) Date: May 24, 2006

(87) PCT Pub. No.: WO2005/006808

PCT Pub. Date: Jan. 20, 2005

(65) Prior Publication Data

US 2007/0055505 A1 Mar. 8, 2007

(30) Foreign Application Priority Data

Jul. 11, 2003 (AU) .............................. 2003903575
Apr. 8, 2004 (AU) .............................. 2004901931

(51) Int. Cl.
*H04B 15/00* (2006.01)

(52) U.S. Cl. ....................... 381/94.1; 381/94.7; 381/92; 381/71.11; 381/71.12; 704/226; 704/233; 379/406.01; 379/406.05; 379/406.08; 379/406.09

(58) Field of Classification Search ............. 381/91–92, 381/122, 94.1–94.3, 94.7, 71.1, 71.14, 71.11–71.12, 381/71.3–71.4, 110; 704/226–228, 233; 379/406.07–406.09, 406.01, 406.05
See application file for complete search history.

(56) References Cited

U.S. PATENT DOCUMENTS 5,917,921 A * 6/1999 Sasaki et al. ............... 381/94.1

(Continued)

FOREIGN PATENT DOCUMENTS

EP 0 700 156 B1 3/1996

OTHER PUBLICATIONS

Neo, et al., "Robust microphone arrays using subband adaptive filters," *IEE Proceedings: Vision, Image and Signal Processing, Institution of Electrical Engineers*, GB, vol. 149, No. 1, Feb. 21, 2002, pp. 17-25, ISSN: 1350-245X, p. 17-21.

(Continued)

*Primary Examiner*—Vivian Chin
*Assistant Examiner*—Disler Paul
(74) *Attorney, Agent, or Firm*—Connolly Bove Lodge & Hutz LLP

(57) ABSTRACT

In one aspect of the present invention, a method to reduce noise in a noisy speech signal is disclosed The method comprises: applying at least two versions of the noisy speech signal to a first filter, whereby that first filter outputs a speech reference signal and at least one noise reference signal, applying a filtering operation to each of the at least one noise reference signals, and subtracting from the speech reference signal each of the filtered noise reference signals, wherein the filtering operation is performed with filters having filter coefficients determined by taking into account speech leakage contributions in the at least one noise reference signal.

19 Claims, 8 Drawing Sheets

U.S. PATENT DOCUMENTS

| | | | | |
|---|---|---|---|---|
| 5,953,380 | A | 9/1999 | Ikeda | |
| 6,178,248 | B1 * | 1/2001 | Marash | 381/94.7 |
| 6,449,586 | B1 * | 9/2002 | Hoshuyama | 702/190 |
| 6,999,541 | B1 * | 2/2006 | Hui | 375/350 |
| 7,206,418 | B2 * | 4/2007 | Yang et al. | 381/92 |
| 2002/0034310 | A1 | 3/2002 | Hou | |

OTHER PUBLICATIONS

Proceedings of the 2003 International Workshop on Acoustic Echo and Noise Control, "Online!" Sep. 8, 2003, pp. 147-150, "Spatially Pre-Processed Speech Distortion Weighted Multi-Channel Wiener Filtering for Noise Reduction in Hearing Aids."

Omologo, M., et al. "Environmental conditions and acoustic transduction in hands-free speech recognition" *Speech Communication*, Amsterdam, NL., vol. 25, No. 1-3, Aug. 1, 1998, pp. 76-95, ISSN: 0167-6393.

Lin, L., et al., "Speech denoising using perceptual modification of Wiener filtering" *Electronics Letters, IEE Stevenage*, GB, vol 38, No. 23, Nov. 7, 2002, pp. 1486-1487, ISSN: 0013-5194.

Link, M.J., et al: "Robust real-time constrained hearing aid arrays," *Applications of Signal Processing to Audio and Acoustics*, 1993, *Final Program and Paper Summaries*, 1993. *IEE Workshop on* New Paltz, NY, USA, Oct. 17-20, 1993, New York NY, USA, *IEEE*. Oct. 17, 1993, pp. 81-84, ISBN: 0-7803-2078-6.

International Search Report, PCT/BE2004/000103.

* cited by examiner

METHOD AND DEVICE FOR NOISE REDUCTION

CROSS-REFERENCE TO RELATED APPLICATIONS

This application is a national stage application under 35 USC §371(c) of CT Application No. PCT/BE2004/000103, entitled "Method and Device for Noise Reduction," filed on Jul. 12, 2004, which claims the priority of Australian Patent No. 2003903575, filed on Jul. 11, 2003, and Australian Patent No. 2004901931, filed on Apr. 8, 2004. The entire disclosure and contents of the above applications are hereby incorporated by reference herein.

BACKGROUND

1. Field of the Invention

The present invention is related to a method and device for adaptively reducing the noise in speech communication applications.

2. Related Art

There are a variety of medical implants which deliver electrical stimulation to a patient or recipient ("recipient" herein) for a variety of therapeutic benefits. For example, the hair cells of the cochlea of a normal healthy ear convert acoustic signals into nerve impulses. People who are profoundly deaf due to the absence of destruction of cochlea hair cells are unable to derive suitable benefit from conventional hearing aid systems. Prosthetic hearing implant systems have been developed to provide such persons with the ability to perceive sound. Prosthetic hearing implant systems bypass the hair cells in the cochlea to directly deliver electrical stimulation to auditory nerve fibers, thereby allowing the brain to perceive a hearing sensation resembling the natural hearing sensation.

The electrodes implemented in stimulating medical implants vary according to the device and tissue which is to be stimulated. For example, the cochlea is tonotopically mapped and partitioned into regions, with each region being responsive to stimulate signals in a particular frequency range. To accommodate this property of the cochlea, prosthetic hearing implant systems typically include an array of electrodes each constructed and arranged to deliver an appropriate stimulating signal to a particular region of the cochlea.

To achieve an optimal electrode position close to the inside wall of the cochlea, the electrode assembly should assume this desired position upon or immediately following implantation into the cochlea. It is also desirable that the electrode assembly be shaped such that the insertion process causes minimal trauma to the sensitive structures of the cochlea. Usually the electrode assembly is held in a straight configuration at least during the initial stages of the insertion procedure, conforming to the natural shape of the cochlear once implantation is complete.

Prosthetic hearing implant systems typically have two primary components: an external component commonly referred to as a speech processor, and an implanted component commonly referred to as a receiver/stimulator unit. Traditionally, both of these components cooperate with each other to provide sound sensations to a recipient.

The external component traditionally includes a microphone that detects sounds, such as speech and environmental sounds, a speech processor that selects and converts certain detected sounds, particularly speech, into a coded signal, a power source such as a battery, and an external transmitter antenna.

The coded signal output by the speech processor is transmitted transcutaneously to the implanted receiver/stimulator unit, commonly located within a recess of the temporal bone of the recipient. This transcutaneous transmission occurs via the external transmitter antenna which is positioned to communicate with an implanted receiver antenna disposed within the receiver/stimulator unit. This communication transmits the coded sound signal while also providing power to the implanted receiver/stimulator unit. Conventionally, this link has been in the form of a radio frequency (RF) link, but other communication and power links have been proposed and implemented with varying degrees of success.

The implanted receiver/stimulator unit traditionally includes the noted receiver antenna that receives the coded signal and power from the external component. The implanted unit also includes a stimulator that processes the coded signal and outputs an electrical stimulation signal to an intra-cochlea electrode assembly mounted to a carrier member. The electrode assembly typically has a plurality of electrodes that apply the electrical stimulation directly to the auditory nerve to produce a hearing sensation corresponding to the original detected sound.

SUMMARY

In one aspect of the present invention, a method to reduce noise in a noisy speech signal is disclosed The method comprises applying at least two versions of the noisy speech signal to a first filter, whereby that first filter outputs a speech reference signal and at least one noise reference signal, applying a filtering operation to each of the at least one noise reference signals, and subtracting from the speech reference signal each of the filtered noise reference signals, wherein the filtering operation is performed with filters having filter coefficients determined by taking into account speech leakage contributions in the at least one noise reference signal.

In another aspect of the invention to a signal processing circuit for reducing noise in a noisy speech signal, is enclosed. This signal processing circuit comprises a first filter having at least two inputs and arranged for outputting a speech reference signal and at least one noise reference signal, a filter to apply the speech reference signal to and filters to apply each of the at least one noise reference signals to, and summation means for subtracting from the speech reference signal the filtered speech reference signal and each of the filtered noise reference signals.

DETAILED DESCRIPTION

Figure 1:
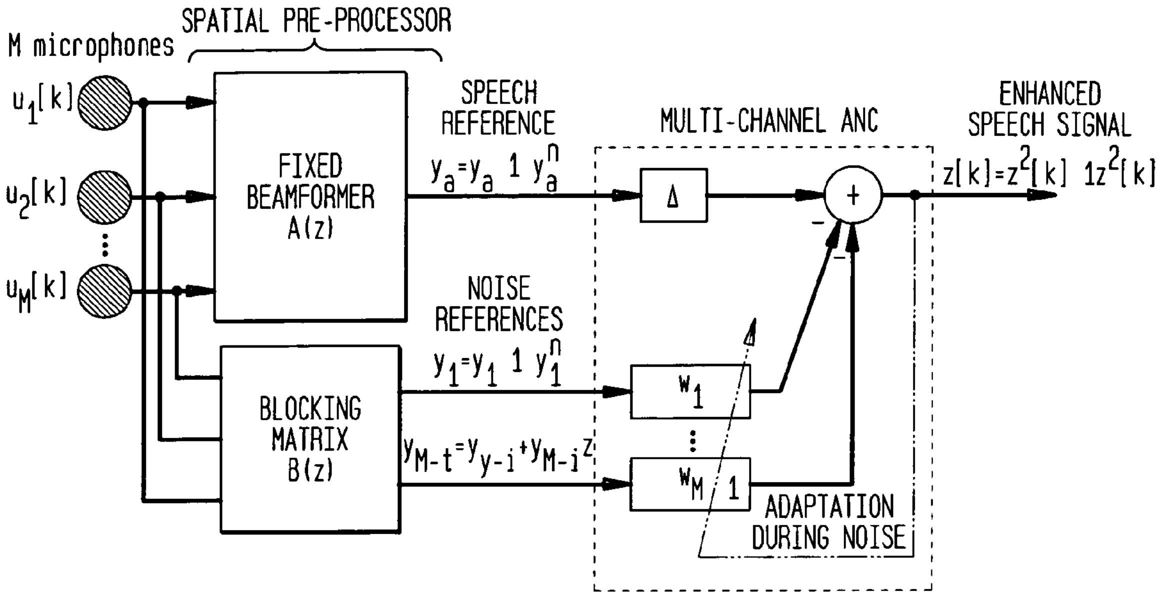
FIG. 1 represents the concept of the Generalised Sidelobe Canceller in accordance with one embodiment of the present invention.

In speech communication applications, such as teleconferencing, hands-free telephony and hearing aids, the presence of background noise may significantly reduce the intelligibility of the desired speech signal. Hence, the use of a noise reduction algorithm is necessary. Multi-microphone systems exploit spatial information in addition to temporal and spectral information of the desired signal and noise signal and are thus preferred to single microphone procedures. Because of aesthetic reasons, multi-microphone techniques for e.g., hearing aid applications go together with the use of small-sized arrays. Considerable noise reduction can be achieved with such arrays, but at the expense of an increased sensitivity to errors in the assumed signal model such as microphone mismatch, reverberation, . . . (see e.g. Stadler & Rabinowitz, 'On the potential of fixed arrays for hearing aids', *J. Acoust. Soc. Amer.,* vol. 94, no. 3, pp. 1332-1342, September 1993) In hearing aids, microphones are rarely matched in gain and phase. Gain and phase differences between microphone characteristics can amount up to 6 dB and 10°, respectively.

A widely studied multi-channel adaptive noise reduction algorithm is the Generalized Sidelobe Canceller (GSC) (see e.g. Griffiths & Jim, 'An alternative approach to linearly constrained adaptive beamforming', *IEEE Trans. Antennas Propag.,* vol. 30, no. 1, pp. 27-34, January 1982 and U.S. Pat. No. 5,473,701 'Adaptive microphone array'). The GSC consists of a fixed, spatial pre-processor, which includes a fixed beamformer and a blocking matrix, and an adaptive stage based on an Adaptive Noise Canceller (ANC). The ANC minimizes the output noise power while the blocking matrix should avoid speech leakage into the noise references. The standard GSC assumes the desired speaker location, the microphone characteristics and positions to be known, and reflections of the speech signal to be absent. If these assumptions are fulfilled, it provides an undistorted enhanced speech signal with minimum residual noise. However, in reality these assumptions are often violated, resulting in so-called speech leakage and hence speech distortion. To limit speech distortion, the ANC is typically adapted during periods of noise only. When used in combination with small-sized arrays, e.g., in hearing aid applications, an additional robustness constraint (see Cox et al., 'Robust adaptive beamforming', *IEEE Trans. Acoust. Speech and Signal Processing*', vol. 35, no. 10, pp. 1365-1376, October 1987) is required to guarantee performance in the presence of small errors in the assumed signal model, such as microphone mismatch. A widely applied method consists of imposing a Quadratic Inequality Constraint to the ANC (QIC-GSC). For Least Mean Squares (LMS) updating, the Scaled Projection Algorithm (SPA) is a simple and effective technique that imposes this constraint. However, using the QIC-GSC goes at the expense of less noise reduction.

A Multi-channel Wiener Filtering (MWF) technique has been proposed (see Doclo & Moonen, 'GSVD-based optimal filtering for single and multimicrophone speech enhancement', IEEE Trans. Signal Processing, vol. 50, no. 9, pp. 2230-2244, September 2002) that provides a Minimum Mean Square Error (MMSE) estimate of the desired signal portion in one of the received microphone signals. In contrast to the ANC of the GSC, the MWF is able to take speech distortion into account in its optimisation criterion, resulting in the Speech Distortion Weighted Multi-channel Wiener Filter (SDW-MWF). The (SDW-)MWF technique is uniquely based on estimates of the second order statistics of the recorded speech signal and the noise signal. A robust speech detection is thus again needed. In contrast to the GSC, the (SDW-)MWF does not make any a priori assumptions about the signal model such that no or a less severe robustness constraint is needed to guarantee performance when used in combination with small-sized arrays. Especially in complicated noise scenarios such as multiple noise sources or diffuse noise, the (SDW-)MWF outperforms the GSC, even when the GSC is supplemented with a robustness constraint.

A possible implementation of the (SDW-)MWF is based on a Generalised Singular Value Decomposition (GSVD) of an input data matrix and a noise data matrix. A cheaper alternative based on a QR Decomposition (QRD) has been proposed in Rombouts & Moonen, 'QRD-based unconstrained optimal filtering for acoustic noise reduction', *Signal Processing,* vol. 83, no. 9, pp. 1889-1904, September 2003. Additionally, a subband implementation results in improved intelligibility at a significantly lower cost compared to the fullband approach. However, in contrast to the GSC and the QIC-GSC, no cheap stochastic gradient based implementation of the (SDW-)MWF is available yet. In Nordholm et al., 'Adaptive microphone array employing calibration signals: an analytical evaluation', *IEEE Trans. Speech, Audio Processing,* vol. 7, no. 3, pp. 241-252, May 1999, an LMS based algorithm for the MWF has been developed. However, said algorithm needs recordings of calibration signals. Since room acoustics, microphone characteristics and the location of the desired speaker change over time, frequent re-calibration is required, making this approach cumbersome and expensive. Also an LMS based SDW-MWF has been proposed that avoids the need for calibration signals (see Florencio & Malvar, 'Multichannel filtering for optimum noise reduction in microphone arrays', *Int. Conf. on Acoust. Speech, and Signal Proc.*, Salt Lake City, USA, pp. 197-200, May 2001). This algorithm however relies on some independence assumptions that are not necessarily satisfied, resulting in degraded performance.

The GSC and MWF techniques are now presented more in detail.

Generalized Sidelobe Canceller (GSC)

FIG. 1 describes the concept of the Generalized Sidelobe Canceller (GSC), which consists of a fixed, spatial pre-processor, i.e. a fixed beamformer A(z) and a blocking matrix B(z), and an ANC. Given M microphone signals $$u_i[k]=u_i^s[k]+u_i^n[k],\ i=1, \ldots, M \quad \text{(equation 1)}$$

with $u_i^s[k]$ the desired speech contribution and $u_i^n[k]$ the noise contribution, the fixed beamformer A(z) (e.g. delay-and-sum) creates a so-called speech reference $$y_0[k]=y_0^s[k]+y_0^n[k], \quad \text{(equation 2)}$$

by steering a beam towards the direction of the desired signal, and comprising a speech contribution $y_0^s[k]$ and a noise contribution $y_0^n[k]$. The blocking matrix B(z) creates M−1 so-called noise references $$y_i[k]=y_i^s[k]+y_i^n[k],\ i=1, \ldots, M-1 \quad \text{(equation 3)}$$

by steering zeroes towards the direction of the desired signal source such that the noise contributions $y_i^n[k]$ are dominant compared to the speech leakage contributions $y_i^s[k]$. In the sequel, the superscripts s and n are used to refer to the speech and the noise contribution of a signal. During periods of speech+noise, the references $y_i[k]$, i=0, . . . M−1 contain speech+noise. During periods of noise only, the references only consist of a noise component, i.e. $y_i[k]=y_i^n[k]$. The second order statistics of the noise signal are assumed to be quite stationary such that they can be estimated during periods of noise only.

To design the fixed, spatial pre-processor, assumptions are made about the microphone characteristics, the speaker position and the microphone positions and furthermore reverberation is assumed to be absent. If these assumptions are satisfied, the noise references do not contain any speech, i.e., $y_i^s[k]=0$, for i=1, . . . , M−1. However, in practice, these assumptions are often violated (e.g. due to microphone mismatch and reverberation) such that speech leaks into the noise references. To limit the effect of such speech leakage, the ANC filter $w_{1:M-1} \in C^{(M-1)L\times 1}$ $$w_{1:M-1}^H=[w_1^H\ w_2^H \ldots w_{M-1}^H] \quad \text{(equation 4)}$$

where $$w_i=[w_i[0]\ w_i[1] \ldots w_i[L-1]]^T, \quad \text{(equation 5)}$$

with L the filter length, is adapted during periods of noise only. (Note that in a time-domain implementation the input signals of the adaptive filter $w_{1:M-1}$ and the filter $w_{1:M-1}$ are real. In the sequel the formulas are generalised to complex input signals such that they can also be applied to a subband implementation.) Hence, the ANC filter $w_{1:M-1}$ minimises the output noise power, i.e.

$$w_{1:M-1} = \arg\min_{w_{1:M-1}} E\{|y_0^n[k-\Delta] - w_{1:M-1}^H[k]y_{1:M-1}^n[k]|^2\} \quad \text{(equation 6)}$$

leading to $$w_{1:M-1}=E\{y_{1:M-1}^n[k]y_{1:M-1}^{n,H}[k]\}^{-1}E\{y_{1:M-1}^n[k]y_0^{n,*}[k-\Delta]\}, \quad \text{(equation 7)}$$

where $$y_{1:M-1}^{n,H}[k]=[y_1^{n,H}[k]\ y_{22}^{n,H}[k] \ldots y_{M-1}^{n,H}[k]] \quad \text{(equation 8)}$$

$$y_i^n[k]=[y_i^n[k]\ y_i^n[k-1] \ldots y_i^n[k-L+1]]^T \quad \text{(equation 9)}$$

and where Δ is a delay applied to the speech reference to allow for non-causal taps in the filter $w_{1:M-1}$. The delay Δ is usually set to $$\left\lceil \frac{L}{2} \right\rceil,$$

where ⌈x⌉ denotes the smallest integer equal to or larger than x. The subscript 1:M−1 in $w_{1:M-1}$ and $y_{1:M-1}$ refers to the subscripts of the first and the last channel component of the adaptive filter and input vector, respectively.

Under ideal conditions ($y_i^s[k]=0$, i=1, . . . , M−1), the GSC minimises the residual noise while not distorting the desired speech signal, i.e. $z^s[k]=y_0^s[k-\Delta]$. However, when used in combination with small-sized arrays, a small error in the assumed signal model (resulting in $y_i^s[k]\neq 0$, i=1, . . . , M−1) already suffices to produce a significantly distorted output speech signal $z^s[k]$.

$$z^s[k]=y_0^s[k-\Delta]-w_{1:M-1}^H y_{1:M-1}^s[k], \quad \text{(equation 10)}$$

even when only adapting during noise-only periods, such that a robustness constraint on $w_{1:M-1}$ is required. In addition, the fixed beamformer A(z) should be designed such that the distortion in the speech reference $y_0^s[k]$ is minimal for all possible model errors. In the sequel, a delay-and-sum beamformer is used. For small-sized arrays, this beamformer offers sufficient robustness against signal model errors, as it minimises the noise sensitivity. The noise sensitivity is defined as the ratio of the spatially white noise gain to the gain of the desired signal and is often used to quantify the sensitivity of an algorithm against errors in the assumed signal model. When statistical knowledge is given about the signal model errors that occur in practice, the fixed beamformer and the blocking matrix can be further optimised.

A common approach to increase the robustness of the GSC is to apply a Quadratic Inequality Constraint (QIC) to the ANC filter $w_{1:M-1}$, such that the optimisation criterion (eq. 6) of the GSC is modified into $$w_{1:M-1} = \arg\min_{w_{1:M-1}} E\{|y_0^n[k-\Delta] - w_{1:M-1}^H[k]y_{1:M-1}^n[k]|^2\} \quad \text{subject to } w_{1:M-1}^H w_{1:M-1} \le \beta^2. \quad \text{(equation 11)}$$

The QIC avoids excessive growth of the filter coefficients $w_{1:M-1}$. Hence, it reduces the undesired speech distortion when speech leaks into the noise references. The QIC-GSC can be implemented using the adaptive scaled projection algorithm (SPA)_: at each update step, the quadratic constraint is applied to the newly obtained ANC filter by scaling the filter coefficients by $$\frac{\beta}{\|w_{1:M-1}\|}$$

when $w_{1:M-1}^H w_{1:M-1}$ exceeds $\beta^2$. Recently, Tian et al. implemented the quadratic constraint by using variable loading ('Recursive least squares implementation for LCMP Beamforming under quadratic constraint', *IEEE Trans. Signal Processing,* vol. 49, no. 6, pp. 1138-1145, June 2001). For Recursive Least Squares (RLS), this technique provides a better approximation to the optimal solution (eq. 11) than the scaled projection algorithm.

Multi-Channel Wiener Filtering (MWF)

The Multi-channel Wiener filtering (MWF) technique provides a Minimum Mean Square Error (MMSE) estimate of the desired signal portion in one of the received microphone signals. In contrast to the GSC, this filtering technique does not make any a priori assumptions about the signal model and is found to be more robust. Especially in complex noise scenarios such as multiple noise sources or diffuse noise, the MWF outperforms the GSC, even when the GSC is supplied with a robustness constraint.

The MWF $\overline{w}_{1:M}\in C^{ML\times 1}$ minimises the Mean Square Error (MSE) between a delayed version of the (unknown) speech signal $u_i^s[k-\Delta]$ at the i-th (e.g. first) microphone and the sum $\overline{w}_{1:M}^H u_{1:M}[k]$ of the M filtered microphone signals, i.e.

$$\overline{w}_{1:M} = \arg\min_{\overline{w}_{1:M}} E\left\{\left|u_i^s[k-\Delta] - \overline{w}_{1:M}^H u_{1:M}[k]\right|^2\right\}, \quad \text{(equation 12)}$$

leading to $$\overline{w}_{1:M} = E\{u_{1:M}[k]u_{1:M}^H[k]\}^{-1} E\{u_{1:M}[k]u_i^{s,*}[k-\Delta]\}, \quad \text{(equation 13)}$$

with $$\overline{w}_{1:M}^H = [\,\overline{w}_1^H \;\; \overline{w}_2^H \;\; \ldots \;\; \overline{w}_M^H\,], \quad \text{(equation 14)}$$

$$u_{1:M}^H[k] = [\,u_1^H[k] \;\; u_2^H[k] \;\; \ldots \;\; u_M^H[k]\,], \quad \text{(equation 15)}$$

$$u_i[k] = [\,u_i[k] \;\; u_i[k-1] \;\; \ldots \;\; u_i[k-L+1]\,]^T. \quad \text{(equation 16)}$$

where $u_i[k]$ comprise a speech component and a noise component.

An equivalent approach consists in estimating a delayed version of the (unknown) noise signal $u_i^n[k-\Delta]$ in the i-th microphone, resulting in $$w_{1:M} = \arg\min_{w_{1:M}} E\left\{\left|u_i^n[k-\Delta] - w_{1:M}^H u_{1:M}[k]\right|^2\right\}, \quad \text{(equation 17)}$$

and $$w_{1:M} = E\{u_{1:M}[k]u_{1:M}^H[k]\}^{-1} E\{u_{1:M}[k]u_i^{n,*}[k-\Delta]\}, \quad \text{(equation 18)}$$

where $$w_{1:M}^H = [\,w_1^H \;\; w_2^H \;\; \ldots \;\; w_M^H\,]. \quad \text{(equation 19)}$$

The estimate z[k] of the speech component $u_i^s[k-\Delta]$ is then obtained by subtracting the estimate $w_{1:M}^H u_{1:M}[k]$ of $u_i^n[k-\Delta]$ from the delayed, i-th microphone signal $u_i[k-\Delta]$, i.e.

$$z[k]=u_i[k-\Delta]-w_{1:M}^H u_{1:M}[k]. \quad \text{(equation 20)}$$

Figure 2:
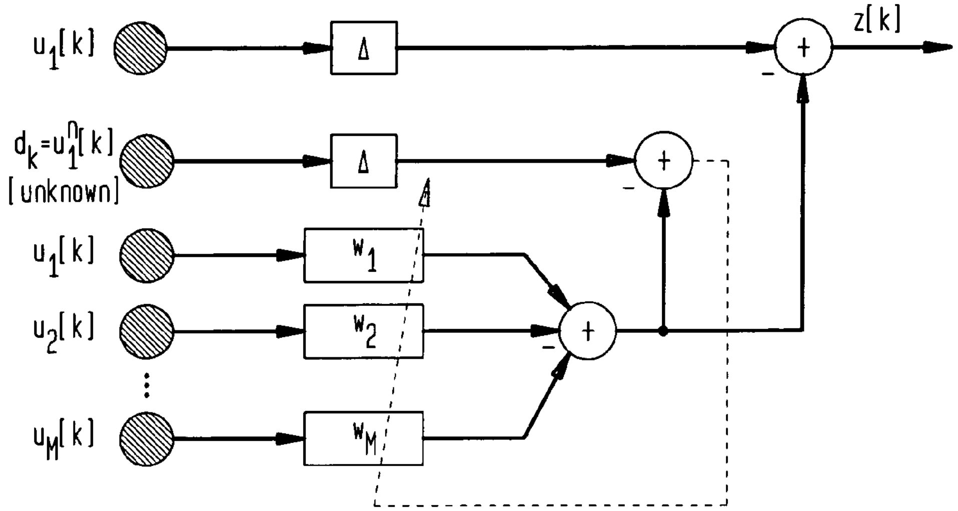
FIG. 2 represents an equivalent approach of multi-channel Wiener filtering in accordance with one embodiment of the present invention.

This is depicted in FIG. 2 for $u_i^n[k-\Delta]=u_1^n[k-\Delta]$.

The residual error energy of the MWF equals $$E\{|e[k]|^2\}=E\{|u_i^s[k-\Delta]-\overline{w}_{1:M}^H u_{1:M}[k]|^2\}, \quad \text{(equation 21)}$$

and can be decomposed into $$\underbrace{E\left\{\left|u_i^s[k-\Delta] - \overline{w}_{1:M}^H u_{1:M}^s[k]\right|^2\right\}}_{\varepsilon_d^2} + \underbrace{E\left\{\left|\overline{w}_{1:M}^H u_{1:M}^n[k]\right|^2\right\}}_{\varepsilon_n^2} \quad \text{(equation 22)}$$

where $\epsilon_d^2$ equals the speech distortion energy and $\epsilon_n^2$ the residual noise energy. The design criterion of the MWF can be generalised to allow for a trade-off between speech distortion and noise reduction, by incorporating a weighting factor μ with $\mu\in[0, \infty]$ $$\overline{w}_{1:M} = \arg\min_{\overline{w}_{1:M}} E\left\{\left|u_i^s[k-\Delta] - \overline{w}_{1:M}^H u_{1:M}^s[k]\right|^2\right\} + \mu E\left\{\left|\overline{w}_{1:M}^H u_{1:M}^n[k]\right|^2\right\}. \quad \text{(equation 23)}$$

The solution of (eq. 23) is given by $$\overline{w}_{1:M}=E\{u_{1:M}^s[k]u_{1:M}^{s,H}[k]+\mu u_{1:M}^n[k]u_{1:M}^{n,H}[k]\}^{-1}E\{u_{1:M}^s[k]u_i^{s,*}[k-\Delta]\}. \quad \text{(equation 24)}$$

Equivalently, the optimisation criterion for $w_{1:M-1}$ in (eq. 17) can be modified into $$w_{1:M} = \arg\min_{w_{1:M}} E\left\{\left|w_{1:M}^H u_{1:M}^s[k]\right|^2\right\} + \mu E\left\{\left|u_i^n[k-\Delta] - w_{1:M}^H u_{1:M}^n[k]\right|^2\right\}, \quad \text{(equation 25)}$$

resulting in $$w_{1:M} = E\left\{u_{1:M}^n[k]u_{1:M}^{n,H}[k] + \frac{1}{\mu}u_{1:M}^s[k]u_{1:M}^{s,H}[k]\right\}^{-1} E\{u_{1:M}^n[k]u_i^{n,*}[k-\Delta]\}. \quad \text{(equation 26)}$$

In the sequel, (eq. 26) will be referred to as the Speech Distortion Weighted Multi-channel Wiener Filter (SDW-MWF).

The factor $\mu\in[0, \infty]$ trades off speech distortion versus noise reduction. If μ=1, the MMSE criterion (eq. 12 ) or (eq. 17) is obtained. If μ>1, the residual noise level will be reduced at the expense of increased speech distortion. By setting μ to ∞, all emphasis is put on noise reduction and speech distortion is completely ignored. Setting μ to 0 on the other hand, results in no noise reduction.

In practice, the correlation matrix $E\{u_{1:M}^s[k]u_{1:M}^{s,H}[k]\}$ is unknown. During periods of speech, the inputs $u_i[k]$ consist of speech+noise, i.e., $u_i[k]=u_i^s[k]+u_i^n[k]$, i=1, . . . , M. During periods of noise, only the noise component $u_i^n[k]$ is observed. Assuming that the speech signal and the noise signal are uncorrelated, $E\{u_{1:M}^s[k]u_{1:M}^{s,H}[k]\}$ can be estimated as $$E\{u_{1:M}^s[k]u_{1:M}^{s,H}[k]\}=E\{u_{1:M}[k]u_{1:M}^H[k]\}-E\{u_{1:M}^n[k]u_{1:M}^{n,H}[k]\}, \quad \text{(equation 27)}$$

where the second order statistics $E\{u_{1:M}[k]u_{1:M}^H[k]\}$ are estimated during speech+noise and the second order statistics $E\{u_{1:M}^n[k]u_{1:M}^{n,H}[k]\}$ during periods of noise only. As for the GSC, a robust speech detection is thus needed. Using (eq. 27), (eq. 24), and (eq. 26) can be re-written as:

$$\overline{w}_{1:M} = \left(E\{u_{1:M}[k]u_{1:M}^H[k]\} + (\mu-1)E\{u_{1:M}^n[k]u_{1:M}^{n,H}[k]\}\right)^{-1} \times \left(E\{u_{1:M}[k]u_i^*[k-\Delta]\} - E\{u_{1:M}^n[k]u_i^{n,*}[k-\Delta]\}\right] \quad \text{(equation 28)}$$

and $$w_{1:M} = \left(\frac{1}{\mu}E\{u_{1:M}[k]u_{1:M}^H[k]\} + \left(1-\frac{1}{\mu}\right)E\{u_{1:M}^n[k]u_{1:M}^{n,H}[k]\}\right)^{-1} E\{u_{1:M}^n[k]u_i^{n,*}[k-\Delta]\}. \quad \text{(equation 29)}$$

The Wiener filter may be computed at each time instant k by means of a Generalised Singular Value Decomposition (GSVD) of a speech+noise and noise data matrix. A cheaper recursive alternative based on a QR-decomposition is also available. Additionally, a subband implementation increases the resulting speech intelligibility and reduces complexity, making it suitable for hearing aid applications.

The present invention is now described in detail. First, the proposed adaptive multi-channel noise reduction technique, referred to as Spatially Pre-processed Speech Distortion Weighted Multi-channel Wiener filter, is described.

A first aspect of the invention is referred to as Speech Distortion Regularised GSC (SDR-GSC). A new design criterion is developed for the adaptive stage of the GSC: the ANC design criterion is supplemented with a regularisation term that limits speech distortion due to signal model errors. In the SDR-GSC, a parameter $\mu$ is incorporated that allows for a trade-off between speech distortion and noise reduction. Focusing all attention towards noise reduction, results in the standard GSC, while, on the other hand, focusing all attention towards speech distortion results in the output of the fixed beamformer. In noise scenarios with low SNR, adaptivity in the SDR-GSC can be easily reduced or excluded by increasing attention towards speech distortion, i.e., by decreasing the parameter $\mu$ to 0. The SDR-GSC is an alternative to the QIC-GSC to decrease the sensitivity of the GSC to signal model errors such as microphone mismatch, reverberation, . . . In contrast to the QIC-GSC, the SDR-GSC shifts emphasis towards speech distortion when the amount of speech leakage grows. In the absence of signal model errors, the performance of the GSC is preserved. As a result, a better noise reduction performance is obtained for small model errors, while guaranteeing robustness against large model errors.

Figure 3:
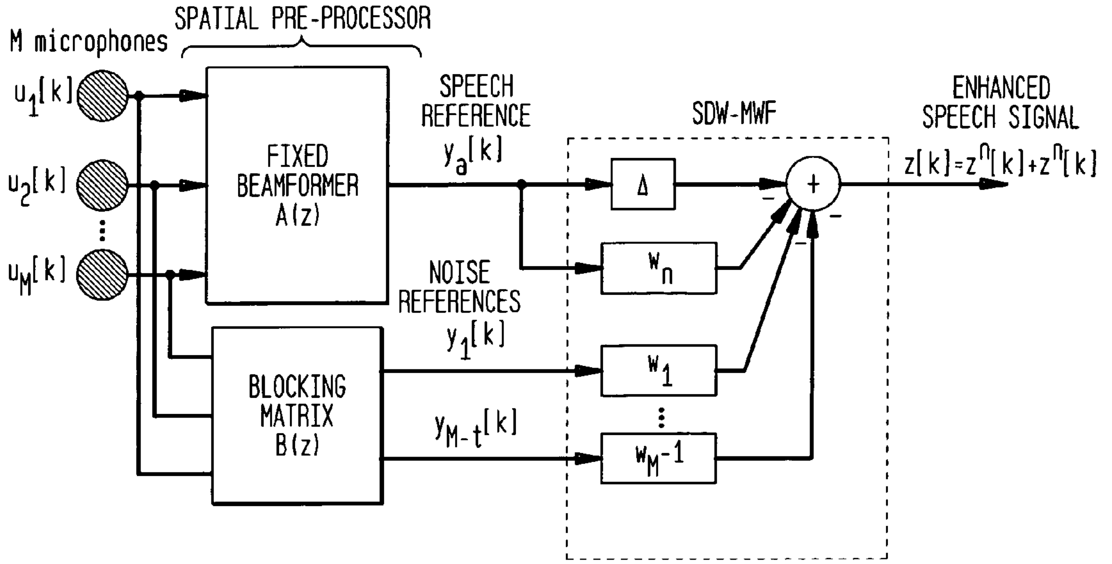
FIG. 3 represents a Spatially Pre-processed SDW-MWF in accordance with one embodiment of the present invention.

In a next step, the noise reduction performance of the SDR-GSC is further improved by adding an extra adaptive filtering operation $w_0$ on the speech reference signal. This generalised scheme is referred to as Spatially Pre-processed Speech Distortion Weighted Multi-channel Wiener Filter (SP-SDW-MWF). The SP-SDW-MWF is depicted in FIG. 3 and encompasses the MWF as a special case. Again, a parameter $\mu$ is incorporated in the design criterion to allow for a trade-off between speech distortion and noise reduction. Focusing all attention towards speech distortion, results in the output of the fixed beamformer. Also here, adaptivity can be easily reduced or excluded by decreasing $\mu$ to 0. It is shown that—in the absence of speech leakage and for infinitely long filter lengths—the SP-SDW-MWF corresponds to a cascade of a SDR-GSC with a Speech Distortion Weighted Single-channel Wiener filter (SDW-SWF). In the presence of speech leakage, the SP-SDW-MWF with $w_0$ tries to preserve its performance: the SP-SDW-MWF then contains extra filtering operations that compensate for the performance degradation due to speech leakage. Hence, in contrast to the SDR-GSC (and thus also the GSC), performance does not degrade due to microphone mismatch. Recursive implementations of the (SDW-)MWF exist that are based on a GSVD or QR decomposition. Additionally, a subband implementation results in improved intelligibility at a significantly lower complexity compared to the fullband approach. These techniques can be extended to implement the SDR-GSC and, more generally, the SP-SDW-MWF.

In this invention, cheap time-domain and frequency-domain stochastic gradient implementations of the SDR-GSC and the SP-SDW-MWF are proposed as well. Starting from the design criterion of the SDR-GSC, or more generally, the SP-SDW-MWF, a time-domain stochastic gradient algorithm is derived. To increase the convergence speed and reduce the computational complexity, the algorithm is implemented in the frequency-domain. To reduce the large excess error from which the stochastic gradient algorithm suffers when used in highly non-stationary noise, a low pass filter is applied to the part of the gradient estimate that limits speech distortion. The low pass filter avoids a highly time-varying distortion of the desired speech component while not degrading the tracking performance needed in time-varying noise scenarios. Experimental results show that the low pass filter significantly improves the performance of the stochastic gradient algorithm and does not compromise the tracking of changes in the noise scenario. In addition, experiments demonstrate that the proposed stochastic gradient algorithm preserves the benefit of the SP-SDW-MWF over the QIC-GSC, while its computational complexity is comparable to the NLMS based scaled projection algorithm for implementing the QIC. The stochastic gradient algorithm with low pass filter however requires data buffers, which results in a large memory cost. The memory cost can be decreased by approximating the regularisation term in the frequency-domain using (diagonal) correlation matrices, making an implementation of the SP-SDW-MWF in commercial hearing aids feasible both in terms of complexity as well as memory cost. Experimental results show that the stochastic gradient algorithm using correlation matrices has the same performance as the stochastic gradient algorithm with low pass filter.

Spatially Pre-processed SDW Multi-channel Wiener Filter

Concept

FIG. 3 depicts the Spatially pre-processed, Speech Distortion Weighted Multi-channel Wiener filter (SP-SDW-MWF). The SP-SDW-MWF consists of a fixed, spatial pre-processor, i.e. a fixed beamformer A(z) and a blocking matrix B(z), and an adaptive Speech Distortion Weighted Multi-channel Wiener filter (SDW-MWF). Given M microphone signals $$u_i[k]=u_i^s[k]+u_i^n[k],\ i=1, \ldots, M \quad \text{(equation 30)}$$

with $u_i^s[k]$ the desired speech contribution and $u_i^n[k]$ the noise contribution, the fixed beamformer A(z) creates a so-called speech reference $$y_0[k]=y_0^s[k]+y_0^n[k], \quad \text{(equation 31)}$$

by steering a beam towards the direction of the desired signal, and comprising a speech contribution $y_0^s[k]$ and a noise contribution $y_0^n[k]$. To preserve the robustness advantage of the MWF, the fixed beamformer A(z) should be designed such that the distortion in the speech reference $y_0^s[k]$ is minimal for all possible errors in the assumed signal model such as microphone mismatch. In the sequel, a delay-and-sum beamformer is used. For small-sized arrays, this beamformer offers sufficient robustness against signal model errors as it minimises the noise sensitivity. Given statistical knowledge about the signal model errors that occur in practice, a further optimised filter-and-sum beamformer A(z) can be designed. The blocking matrix B(z) creates M−1 so-called noise references $$y_i[k]=y_i^s[k]+y_i^n[k],\ i=1, \ldots, M-1 \qquad \text{(equation 32)}$$

by steering zeroes towards the direction of interest such that the noise contributions $y_i^n[k]$ are dominant compared to the speech leakage contributions $y_i^s[k]$. A simple technique to create the noise references consists of pairwise subtracting the time-aligned microphone signals. Further optimised noise references can be created, e.g. by minimising speech leakage for a specified angular region around the direction of interest instead of for the direction of interest only (e.g. for an angular region from −20° to 20° around the direction of interest). In addition, given statistical knowledge about the signal model errors that occur in practice, speech leakage can be minimised for all possible signal model errors.

In the sequel, the superscripts s and n are used to refer to the speech and the noise contribution of a signal. During periods of speech+noise, the references $y_i[k]$, i=0, . . . , M−1 contain speech+noise. During periods of noise only, $y_i[k]$, i=0, . . . , M−1 only consist of a noise component, i.e. $y_i[k]=y_i^n[k]$. The second order statistics of the noise signal are assumed to be quite stationary such that they can be estimated during periods of noise only.

The SDW-MWF filter $w_{0:M-1}$ $$w_{0:M-1} = \begin{pmatrix} \frac{1}{\mu} E\{ y^s_{0:M-1}[k] y^{s,H}_{0:M-1}[k]\} + \\ E\{ y^n_{0:M-1}[k] y^{n,H}_{0:-1}[k]\} \end{pmatrix}^{-1} E\left\{ \begin{matrix} y^n_{0:M-1}[k] \\ y_0^{n,*}[k-\Delta] \end{matrix} \right\}, \qquad \text{(equation 33)}$$

with $$w^H_{0:M-1}[k] = [w_0^H[k]\ w_1^H[k] \ldots w^H_{M-1}[k]], \qquad \text{(equation 34)}$$

$$w_i[k] = [w_i[0]\ w_i[1] \ldots w_i[L-1]]^T \qquad \text{(equation 35)}$$

$$y^H_{0:M-1}[k] = [y_0^H[k]\ y_1^H[k] \ldots y^H_{M-1}[k]], \qquad \text{(equation 36)}$$

$$y_i[k] = [y_i[k]\ y_i[k-1] \ldots y_i[k-L+1]]^T, \qquad \text{(equation 37)}$$

provides an estimate $w_{0:M-1}^H y_{0:M-1}[k]$ of the noise contribution $y_0^n[k-\Delta]$ in the speech reference by minimising the cost function $J(w_{0:M-1})$ $$J(w_{0:M-1}) = \frac{1}{\mu} \underbrace{E\{|w^H_{0:M-1} y^s_{0:M-1}[k]|^2\}}_{\varepsilon_d^2} + \underbrace{E\{|y_0^n[k-\Delta] - w^H_{0:M-1} y^{ii}_{0:M-1}[k]|^2\}}_{\varepsilon_n^d}. \qquad \text{(equation 38)}$$

The subscript 0:M−1 in $w_{0:M-1}$ and $y_{0:M-1}$ refers to the subscripts of the first and the last channel component of the adaptive filter and the input vector, respectively. The term $\epsilon_d^2$ represents the speech distortion energy and $\epsilon_n^2$ the residual noise energy. The term $$\frac{1}{\mu}\varepsilon_d^2$$

in the cost function (eq.38) limits the possible amount of speech distortion at the output of the SP-SDW-MWF. Hence, the SP-SDW-MWF adds robustness against signal model errors to the GSC by taking speech distortion explicitly into account in the design criterion of the adaptive stage. The parameter $$\frac{1}{\mu} \in [0, \infty)$$

trades off noise reduction and speech distortion: the larger 1/μ, the smaller the amount of possible speech distortion. For μ=0, the output of the fixed beamformer A(z), delayed by Δ samples is obtained. Adaptivity can be easily reduced or excluded in the SP-SDW-MWF by decreasing μ to 0(e.g., in noise scenarios with very low signal-to-noise Ratio (SNR), e.g., −10 dB, a fixed beamformer may be preferred.) Additionally, adaptivity can be limited by applying a QIC to $w_{0:M-1}$.

Note that when the fixed beamformer A(z) and the blocking matrix B(z) are set to $$A(z) = [1\ \ 0\ \ \cdots\ \ 0]^H \qquad \text{(equation 39)}$$

$$B(z) = \begin{bmatrix} 0 & 1 & 0 & L & 0 \\ 0 & O & O & O & M \\ M & O & 0 & 1 & 0 \\ 0 & L & 0 & 0 & 1 \end{bmatrix}^H, \qquad \text{(equation 40)}$$

one obtains the original SDW-MWF that operates on the received microphone signals $u_i[k]$, i=1, . . . , M.

Below, the different parameter settings of the SP-SDW-MWF are discussed. Depending on the setting of the parameter μ and the presence or the absence of the filter $w_0$, the GSC, the (SDW-)MWF as well as in-between solutions such as the Speech Distortion Regularised GSC (SDR-GSC) are obtained. One distinguished between two cases, i.e. the case where no filter $w_0$ is applied to the speech reference (filter length $L_0$=0) and the case where an additional filter $w_0$ is used ($L_0$≠0).

SDR-GSC, i.e., SP-SDW-MWF without $w_0$

First, consider the case without $w_0$, i.e. $L_0$=0. The solution for $w_{1:M-1}$ in (eq.33) then reduces to $$\arg\min_{w_{1:M-1}} \underbrace{\frac{1}{\mu}E\{|w_{1:M-1}^H y_{1:M-1}^s[k]|^2\}}_{\varepsilon_d^2} + \underbrace{E\{|y_0^n[k-\Delta] - w_{1:M-1}^H y_{1:M-1}^n[k]|^2\}}_{\varepsilon_n^2}, \quad \text{(equation 41)}$$

leading to $$w_{1:M-1} = \left(\frac{1}{\mu}E\{y_{1:M-1}^s[k]y_{1:M-1}^{s,H}[k]\} + E\{y_{1:M-1}^n[k]y_{1:M-1}^{n,H}[k]\}\right)^{-1} E\{y_{1:M-1}^n[k]y_0^{n,*}[k-\Delta]\} \quad \text{(equation 42)}$$

where $\epsilon_d^2$ is the speech distortion energy and $\epsilon_n^2$ the residual noise energy.

Compared to the optimisation criterion (eq. 6) of the GSC, a regularisation term $$\frac{1}{\mu}E\{|w_{1:M-1}^H y_{1:M-1}^s[k]|^2\} \quad \text{(equation 43)}$$

has been added. This regularisation term limits the amount of speech distortion that is caused by the filter $w_{1:M-1}$ when speech leaks into the noise references, i.e. $y_i^s[k]\neq 0$, i=1, . . . , M−1. In the sequel, the SP-SDW-MWF with $L_0=0$ is therefore referred to as the Speech Distortion Regularized GSC (SDR-GSC). The smaller μ, the smaller the resulting amount of speech distortion will be. For μ=0, all emphasis is put on speech distortion such that z[k] is equal to the output of the fixed beamformer A(z) delayed by Δ samples. For μ=∞ all emphasis is put on noise reduction and speech distortion is not taken into account. This corresponds to the standard GSC. Hence, the SDR-GSC encompasses the GSC as a special case.

The regularisation term (eq. 43) with 1/μ≠0 adds robustness to the GSC, while not affecting the noise reduction performance in the absence of speech leakage:

- In the absence of speech leakage, i.e., $y_i^s[k]=0$, i=1, . . . , M−1, the regularisation term equals 0 for all $w_{1:M-1}$ and hence the residual noise energy $\epsilon_n^2$ is effectively minimised. In other words, in the absence of speech leakage, the GSC solution is obtained.
- In the presence of speech leakage, i.e., $y_i^s[k]\neq 0$, i=1, . . . M−1, speech distortion is explicitly taken into account in the optimisation criterion (eq.41) for the adaptive filter $w_{1:M-1}$, limiting speech distortion while reducing noise. The larger the amount of speech leakage, the more attention is paid to speech distortion.

To limit speech distortion alternatively, a QIC is often imposed on the filter $w_{1:M-1}$. In contrast to the SDR-GSC, the QIC acts irrespective of the amount of speech leakage $y^s[k]$ that is present. The constraint value $\beta^2$ in (eq. 11) has to be chosen based on the largest model errors that may occur. As a consequence, noise reduction performance is compromised even when no or very small model errors are present. Hence, the QIC is more conservative than the SDR-GSC, as will be shown in the experimental results.

SP-SDW-MWF with Filter $w_0$

Since the SDW-MWF (eq.33) takes speech distortion explicitly into account in its optimisation criterion, an additional filter $w_0$ on the speech reference $y_0[k]$ may be added. The SDW-MWF (eq.33) then solves the following more general optimisation criterion $$w_{0:M-1} = \underset{w_{0:M-1}}{\operatorname{argmin}} \underbrace{E\left\{\left|y_0^n[k-\Delta] - \begin{bmatrix} w_0^H & w_{1:M-1}^H \end{bmatrix}\begin{bmatrix} y_0^n[k] \\ y_{1:M-1}^n[k]\end{bmatrix}\right|^2\right\}}_{\varepsilon_n^2} + \underbrace{\frac{1}{\mu}E\left\{\left|\begin{bmatrix} w_0^H & w_{1:M-1}^H \end{bmatrix}\begin{bmatrix} y_0^s[k] \\ y_{1:M-1}^s[k]\end{bmatrix}\right|^2\right\}}_{\varepsilon_d^2}, \quad \text{(equation 44)}$$

where $w_{0:M-1}^H=[w_0^H\ w_{1:M-1}^H]$ is given by (eq.33).

Again, μ trades off speech distortion and noise reduction. For μ=∞ speech distortion $\epsilon_d^2$ is completely ignored, which results in a zero output signal. For μ=0 all emphasis is put on speech distortion such that the output signal is equal to the output of the fixed beamformer delayed by Δ samples.

Figure 4:
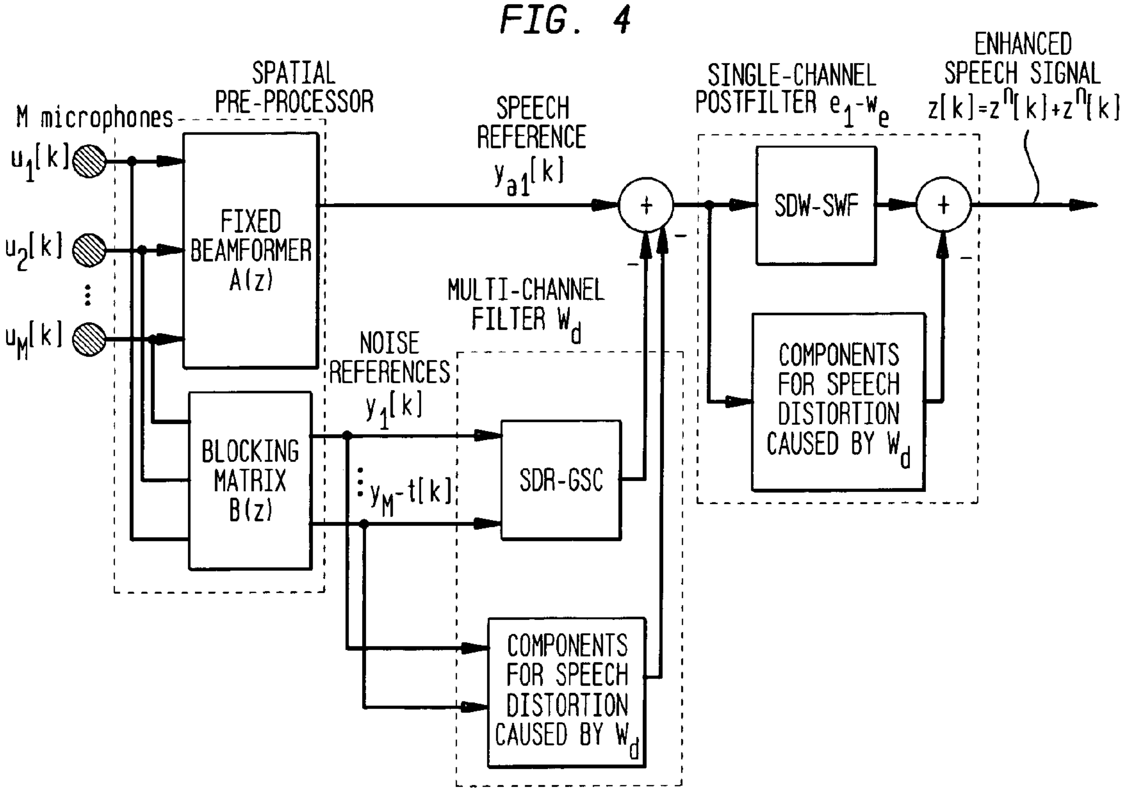
FIG. 4 represents the decomposition of SP-SDW-MWF with $w_0$ in a multi-channel filter $w_d$ and single-channel postfilter $e_1$-$w_0$ in accordance with one embodiment of the present invention.

In addition, the observation can be made that in the absence of speech leakage, i.e., $y_i^s[k]=0$, i=1, . . . , M−1, and for infinitely long filters $w_i$, i=0, . . . , M−1, the SP-SDW-MWF (with $w_0$) corresponds to a cascade of an SDR-GSC and an SDW single-channel WF (SDW-SWF) postfilter. In the presence of speech leakage, the SP-SDW-MWF (with $w_0$) tries to preserve its performance: the SP-SDW-MWF then contains extra filtering operations that compensate for the performance degradation due to speech leakage. This is illustrated in FIG. 4. It can e.g. be proven that, for infinite filter lengths, the performance of the SP-SDW-MWF (with $w_0$) is not affected by microphone mismatch as long as the desired speech component at the output of the fixed beamformer A(z) remains unaltered.

Experimental Results

The theoretical results are now illustrated by means of experimental results for a hearing aid application. First, the set-up and the performance measures used, are described. Next, the impact of the different parameter settings of the SP-SDW-MWF on the performance and the sensitivity to signal model errors is evaluated. Comparison is made with the QIC-GSC.

Figure 5:
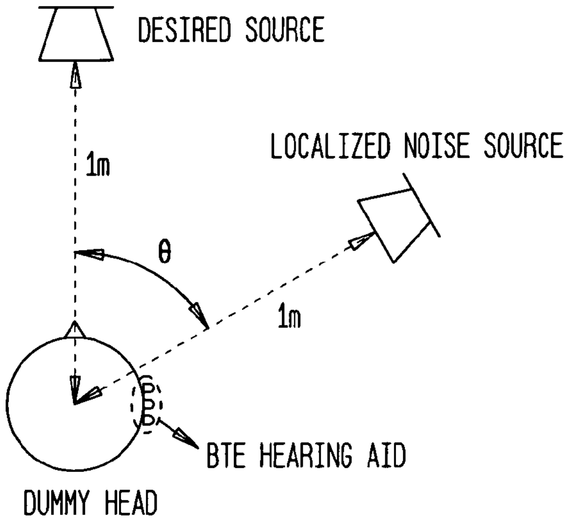
FIG. 5 represents the set-up for the experiments in accordance with one embodiment of the present invention.

FIG. 5 depicts the set-up for the experiments. A three-microphone Behind-The-Ear (BTE) hearing aid with three omnidirectional microphones (Knowles FG-3452) has been mounted on a dummy head in an office room. The interspacing between the first and the second microphone is about 1 cm and the interspacing between the second and the third microphone is about 1.5 cm. The reverberation time $T_{60dB}$ of the room is about 700 ms for a speech weighted noise. The desired speech signal and the noise signals are uncorrelated. Both the speech and the noise signal have a level of 70 dB SPL at the centre of the head. The desired speech source and noise sources are positioned at a distance of 1 meter from the head: the speech source in front of the head (0°), the noise sources at an angle θ w.r.t. the speech source (see also FIG. 5). To get an idea of the average performance based on directivity only, stationary speech and noise signals with the same, average long-term power spectral density are used. The total duration of the input signal is 10 seconds of which 5 seconds contain noise only and 5 seconds contain both the speech and the noise signal. For evaluation purposes, the speech and the noise signal have been recorded separately.

The microphone signals are pre-whitened prior to processing to improve intelligibility, and the output is accordingly de-whitened. In the experiments, the microphones have been calibrated by means of recordings of an anechoic speech weighted noise signal positioned at 0°, measured while the microphone array is mounted on the head. A delay-and-sum beamformer is used as a fixed beamformer, since—in case of small microphone interspacing—it is known to be very robust to model errors. The blocking matrix B pairwise subtracts the time aligned calibrated microphone signals.

To investigate the effect of the different parameter settings (i.e. μ, $w_0$) on the performance, the filter coefficients are computed using (eq.33) where $E\{y_{0:M-1}{}^{s} y_{0:M-1}{}^{s,H}\}$ is estimated by means of the clean speech contributions of the microphone signals. In practice, $E\{y_{0:M-1}{}^{s} y_{0:M-1}{}^{s,H}\}$ is approximated using (eq. 27). The effect of the approximation (eq. 27) on the performance was found to be small (i.e. differences of at most 0.5 dB in intelligibility weighted SNR improvement) for the given data set. The QIC-GSC is implemented using variable loading RLS. The filter length L per channel equals 96.

To assess the performance of the different approaches, the broadband intelligibility weighted SNR improvement is used, defined as $$\Delta SNR_{intellig} = \sum_i I_i (SNR_{i,out} - SNR_{i,in}), \qquad \text{(equation 45)}$$

where the band importance function $I_i$ expresses the importance of the i-th one-third octave band with centre frequency $f_i^c$ for intelligibility, $SNR_{i,out}$ is the output SNR (in dB) and $SNR_{i,in}$ is the input SNR (in dB) in the i-th one third octave band ('*ANSI S*3.5-1997, *American National Standard Methods for Calculation of the Speech Intelligibility Index*'). The intelligibility weighted SNR reflects how much intelligibility is improved by the noise reduction algorithm, but does not take into account speech distortion.

To measure the amount of speech distortion, we define the following intelligibility weighted spectral distortion measure $$SD_{intellig} = \sum_i I_i SD_i \qquad \text{(equation 46)}$$

with $SD_i$ the average spectral distortion (dB) in i-th one-third band, measured as $$SD_i = \int_{2^{-1/6} f_i^c}^{2^{1/6} f_i^c} |10\log_{10} G^s(f)| df / [(2^{1/6} - 2^{-1/6}) f_i^c], \qquad \text{(equation 47)}$$

with $G^s(f)$ the power transfer function of speech from the input to the output of the noise reduction algorithm. To exclude the effect of the spatial pre-processor, the performance measures are calculated w.r.t. the output of the fixed beamformer.

The impact of the different parameter settings for μ and $w_0$ on the performance of the SP-SDW-MWF is illustrated for a five noise source scenario. The five noise sources are positioned at angles 75°, 120°, 180°, 240°, 285° w.r.t. the desired source at 0°. To assess the sensitivity of the algorithm against errors in the assumed signal model, the influence of microphone mismatch, e.g., gain mismatch of the second microphone, on the performance is evaluated. Among the different possible signal model errors, microphone mismatch was found to be especially harmful to the performance of the GSC in a hearing aid application. In hearing aids, microphone are rarely matched in gain and phase. Gain and phase differences between microphone characteristics of up to 6 dB and 10°, respectively, have been reported.

SP-SDW-MWF without $w_0$ (SDR-GSC)

Figure 6:
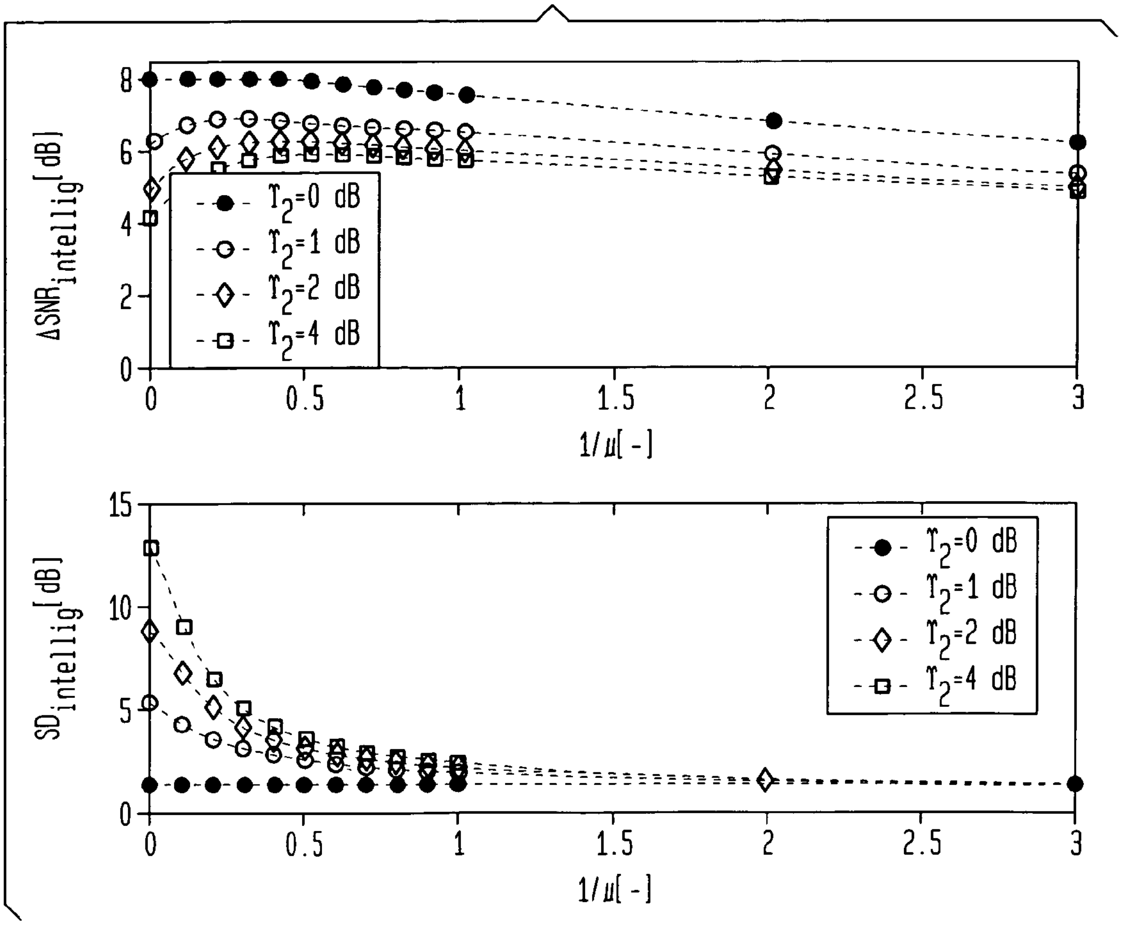
FIG. 6 represents the influence of $1/\mu$ on the performance of the SDR GSC for different gain mismatches $Y_2$ at the second microphone in accordance with one embodiment of the present invention.

FIG. 6 plots the improvement $\Delta SNR_{intellig}$ and the speech distortion $SD_{intellig}$ as a function of 1/μ obtained by the SDR-GSC (i.e., the SP-SDW-MWF without filter $w_0$) for different gain mismatches $Y_2$ at the second microphone. In the absence of microphone mismatch, the amount of speech leakage into the noise references is limited. Hence, the amount of speech distortion is low for all μ. Since there is still a small amount of speech leakage due to reverberation, the amount of noise reduction and speech distortion slightly decreases for increasing 1/μ, especially for 1/μ>1. In the presence of microphone mismatch, the amount of speech leakage into the noise references grows. For 1/μ=0 (GSC), the speech gets significantly distorted. Due to the cancellation of the desired signal, also the improvement $\Delta SNR_{intellig}$ degrades. Setting 1/μ>0 improves the performance of the GSC in the presence of model errors without compromising performance in the absence of signal model errors. For the given set-up, a value 1/μ around 0.5 seems appropriate for guaranteeing good performance for a gain mismatch up to 4 dB.

SP-SDW-MWF with Filter $w_0$

Figure 7:
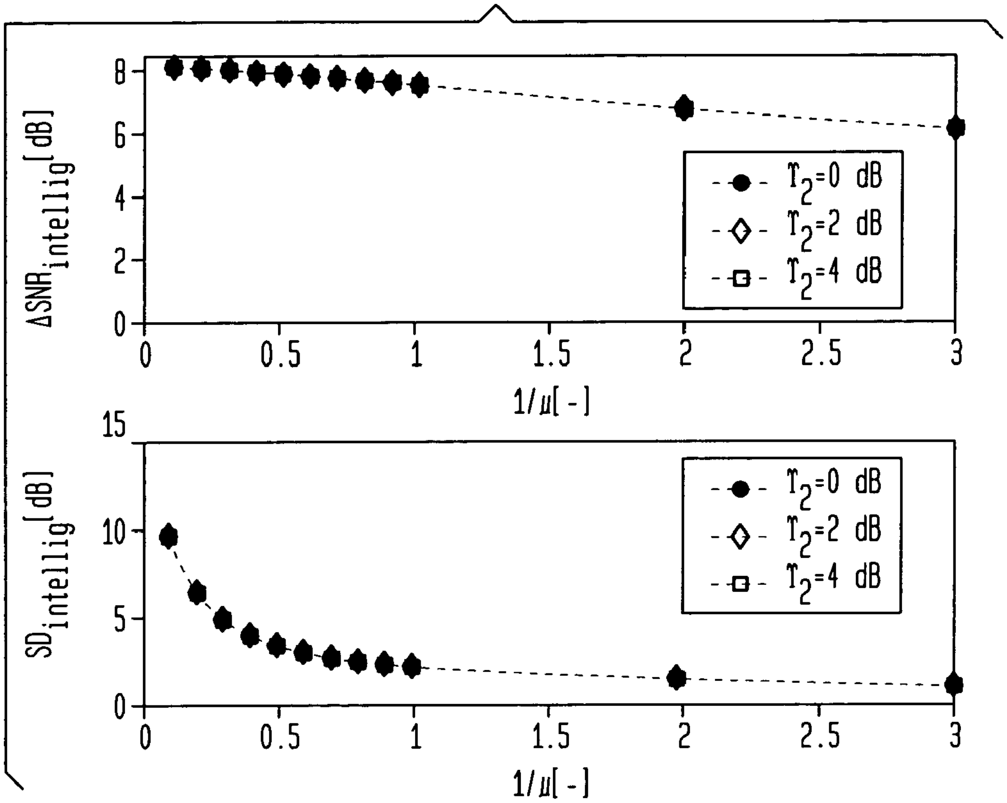
FIG. 7 represents the influence of $1/\mu$ on the performance of the SP-SDW-MWF with $w_0$ for different gain mismatches $Y_2$ at the second microphone in accordance with one embodiment of the present invention.

FIG. 7 plots the performance measures $\Delta SNR_{intellig}$ and $SD_{intellig}$ of the SP-SDW-MWF with filter $w_0$. In general, the amount of speech distortion and noise reduction grows for decreasing 1/μ. For 1/μ=0, all emphasis is put on noise reduction. As also illustrated by FIG. 7, this results in a total cancellation of the speech and the noise signal and hence degraded performance. In the absence of model errors, the settings $L_0$=0 and $L_0$≠0 result—except for 1/μ=0—in the same $\Delta SNR_{intellig}$, while the distortion for the SP-SDW-MWF with $w_0$ is higher due to the additional single-channel SDW-SWF. For $L_0$≠0 the performance does—in contrast to $L_0$=0—not degrade due to the microphone mismatch.

Figure 8:
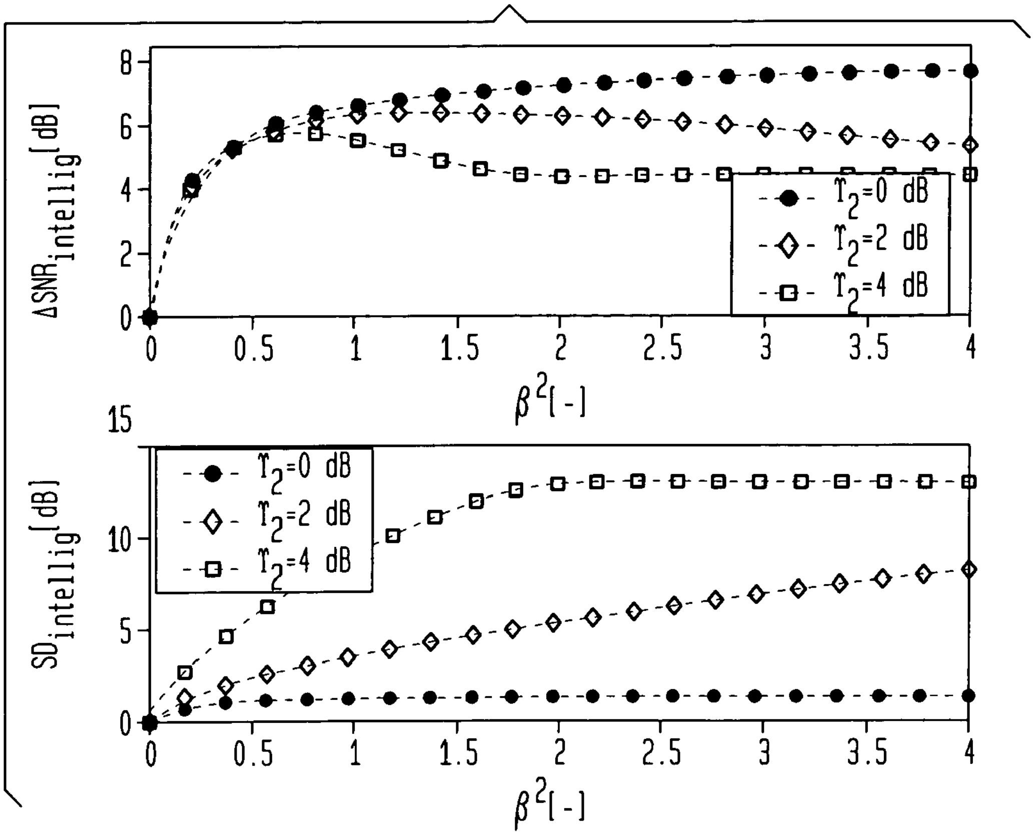
FIG. 8 represents the $\Delta SNR_{intellig}$ and $SD_{intellig}$ for QIC-GSC as a function of $\beta^2$ for different gain mismatches $Y_2$ at the second microphone in accordance with one embodiment of the present invention.

FIG. 8 depicts the improvement $\Delta SNR_{intellig}$ and the speech distortion $SD_{intellig}$, respectively, of the QIC-GSC as a function of $\beta^2$. Like the SDR-GSC, the QIC increases the robustness of the GSC. The QIC is independent of the amount of speech leakage. As a consequence, distortion grows fast with increasing gain mismatch. The constraint value β should be chosen such that the maximum allowable speech distortion level is not exceeded for the largest possible model errors. Obviously, this goes at the expense of reduced noise reduction for small model errors. The SDR-GSC on the other hand, keeps the speech distortion limited for all model errors (see FIG. 6). Emphasis on speech distortion is increased if the amount of speech leakage grows. As a result, a better noise reduction performance is obtained for small model errors, while guaranteeing sufficient robustness for large model errors. In addition, FIG. 7 demonstrates that an additional filter $w_0$ significantly improves the performance in the presence of signal model errors.

In the previously discussed embodiments a generalised noise reduction scheme has been established, referred to as Spatially pre-processed, Speech Distortion Weighted Multi-channel Wiener Filter (SP-SDW-MWF), that comprises a fixed, spatial pre-processor and an adaptive stage that is based on a SDW-MWF. The new scheme encompasses the GSC and MWF as special cases. In addition, it allows for an in-between solution that can be interpreted as a Speech Distortion Regularised GSC (SDR-GSC). Depending on the setting of a trade-off parameter μ and the presence or absence of the filter $w_0$ on the speech reference, the GSC, the SDR-GSC or a (SDW-) MWF is obtained. The different parameter settings of the SP-SDW-MWF can be interpreted as follows:

Without $w_0$, the SP-SDW-MWF corresponds to an SDR-GSC: the ANC design criterion is supplemented with a regularisation term that limits the speech distortion due to signal model errors. The larger 1/μ, the smaller the amount of distortion. For 1/μ=0, distortion is completely ignored, which corresponds to the GSC-solution. The SDR-GSC is then an alternative technique to the QIC-GSC to decrease the sensitivity of the GSC to signal model errors. In contrast to the QIC-GSC, the SDR-GSC shifts emphasis towards speech distortion when the amount of speech leakage grows. In the absence of signal model errors, the performance of the GSC is preserved. As a result, a better noise reduction performance is obtained for small model errors, while guaranteeing robustness against large model errors.

Since the SP-SDW-MWF takes speech distortion explicitly into account, a filter $w_0$ on the speech reference can be added. It can be shown that—in the absence of speech leakage and for infinitely long filter lengths—the SP-SDW-MWF corresponds to a cascade of an SDR-GSC with an SDW-SWF postfilter. In the presence of speech leakage, the SP-SDW-MWF with $w_0$ tries to preserve its performance: the SP-SDW-MWF then contains extra filtering operations that compensate for the performance degradation due to speech leakage. In contrast to the SDR-GSC (and thus also the GSC), the performance does not degrade due to microphone mismatch.

Experimental results for a hearing aid application confirm the theoretical results. The SP-SDW-MWF indeed increases the robustness of the GSC against signal model errors. A comparison with the widely studied QIC-GSC demonstrates that the SP-SDW-MWF achieves a better noise reduction performance for a given maximum allowable speech distortion level.

Stochastic Gradient Implementations

Recursive implementations of the (SDW-)MWF have been proposed based on a GSVD or QR decomposition. Additionally, a subband implementation results in improved intelligibility at a significantly lower cost compared to the fullband approach. These techniques can be extended to implement the SP-SDW-MWF. However, in contrast to the GSC and the QIC-GSC, no cheap stochastic gradient based implementation of the SP-SDW-MWF is available. In the present invention, time-domain and frequency-domain stochastic gradient implementations of the SP-SDW-MWF are proposed that preserve the benefit of matrix-based SP-SDW-MWF over QIC-GSC. Experimental results demonstrate that the proposed stochastic gradient implementations of the SP-SDW-MWF outperform the SPA, while their computational cost is limited.

Starting from the cost function of the SP-SDW-MWF, a time-domain stochastic gradient algorithm is derived. To increase the convergence speed and reduce the computational complexity, the stochastic gradient algorithm is implemented in the frequency-domain. Since the stochastic gradient algorithm suffers from a large excess error when applied in highly time-varying noise scenarios, the performance is improved by applying a low pass filter to the part of the gradient estimate that limits speech distortion. The low pass filter avoids a highly time-varying distortion of the desired speech component while not degrading the tracking performance needed in time-varying noise scenarios. Next, the performance of the different frequency-domain stochastic gradient algorithms is compared. Experimental results show that the proposed stochastic gradient algorithm preserves the benefit of the SP-SDW-MWF over the QIC-GSC. Finally, it is shown that the memory cost of the frequency-domain stochastic gradient algorithm with low pass filter is reduced by approximating the regularisation term in the frequency-domain using (diagonal) correlation matrices instead of data buffers. Experiments show that the stochastic gradient algorithm using correlation matrices has the same performance as the stochastic gradient algorithm with low pass filter.

Stochastic Gradient Algorithm

Derivation

A stochastic gradient algorithm approximates the steepest descent algorithm, using an instantaneous gradient estimate. Given the cost function (eq.38), the steepest descent algorithm iterates as follows (note that in the sequel the subscripts 0:M−1 in the adaptive filter $w_{0:M-1}$ and the input vector $y_{0:M-1}$ are omitted for the sake of conciseness):

$$\begin{aligned} w[n+1] &= w[n] + \frac{\rho}{2}\left(-\frac{\partial J(w)}{\partial w}\right)_{w=w[n]} \\ &= w[n] + \rho \begin{pmatrix} E\{y^n[k]y_0^{n,*}[k-\Delta]\} - \\ E\{y^n[k]y^{n,H}[k]\}w[n] - \\ \frac{1}{\mu}E\{y^s[k]y^{s,H}[k]\}w[n] \end{pmatrix}, \end{aligned} \quad \text{(equation 48)}$$

with $w[k], y[k] \in \mathbb{C}^{NL\times 1}$, where N denotes the number of input channels to the adaptive filter and L the number of filter taps per channel. Replacing the iteration index n by a time index k and leaving out the expectation values E{.}, one obtains the following update equation $$w[k+1] = w[k] + \rho\left\{y^n[k](y_0^{n,*}[k-\Delta] - y^{n,H}[k]w[k]) - \underbrace{\frac{1}{\mu}y^s[k]y^{s,H}[k]w[k]}_{r[k]}\right\}. \quad \text{(equation 49)}$$

For 1/μ=0 and no filter $w_0$ on the speech reference, (eq.49) reduces to the update formula used in GSC during periods of noise only (i.e., when $y_i[k]=y_i^n[k]$, i=0, . . . , M−1). The additional term r[k] in the gradient estimate limits the speech distortion due to possible signal model errors.

Equation (49) requires knowledge of the correlation matrix $y^s[k]y^{s,H}[k]$ or $E\{y^s[k]y^{s,H}[k]\}$ of the clean speech. In practice, this information is not available. To avoid the need for calibration speech+noise signal vectors $y_{buf_1}$ are stored into a circular buffer $$B_1 \in R^{N\times L_{buf_1}}$$

during processing. During periods of noise only (i.e., when $y_i[k]=y_i^n[k]$, i=0, . . . , M−1), the filter w is updated using the following approximation of the term $$r[k] = \frac{1}{\mu} y^s[k] y^{s,H}[k] w[k]$$

n (eq.49)

$$\frac{1}{\mu} y^s y^{s,H}[k] w[k] \approx \frac{1}{\mu}\left(y_{buf_1} y_{buf_1}^H[k] - yy^H[k]\right) w[k], \qquad \text{(equation 50)}$$

which results in the update formula $$w[k+1] = w[k] + \rho\Bigg\{y[k]\left(y_0^*[k-\Delta] - y^H[k]w[k]\right) - \underbrace{\frac{1}{\mu}\left(y_{buf_1}[k] y_{buf_1}^H[k] - y[k]y^H[k]\right)w[k]}_{r[k]}\Bigg\}. \qquad \text{(equation 51)}$$

In the sequel, a normalised step size ρ is used, i.e.

$$\rho = \frac{\rho'}{\frac{1}{\mu}\left|y_{buf_1}^H[k] y_{buf_1}[k] - y^H[k]y[k]\right| + y^H[k]y[k] + \delta}, \qquad \text{(equation 52)}$$

where δ is a small positive constant. The absolute value $|y_{buf_1}^H y_{buf_1} - y^H y|$ has been inserted to guarantee a positive valued estimate of the clean speech energy $y^{s,H}[k]y^s[k]$. Additional storage or noise only vectors $y_{buf_2}$ in a second buffer $$B_2 \in R^{M\times L_{buf_2}}$$

allows to adapt w also during periods of speech+noise, using $$w[k+1] = w[k] + \rho \left\{ \begin{array}{c} y_{buf_2}[k] \\ \left(y_{0,buf_2}^*[k-\Delta] - y_{buf_2}^H[k]w[k]\right) + \\ \frac{1}{\mu}\left(y_{buf_2}[k] y_{buf_2}^H[k] - y^H[k]\right)w[k] \end{array} \right\} \qquad \text{(equation 53)}$$

-continued $$\rho = \frac{\rho'}{\frac{1}{\mu}\left|y^H[k]y[k] - y_{buf_2}^H[k] y_{buf2}[k]\right| + y_{buf2}^H[k] y_{buf_2}[k] + \delta}. \qquad \text{(equation 54)}$$

For reasons of conciseness only the update procedure of the time-domain stochastic gradient algorithms during noise only will be considered in the sequel, hence $y[k]=y^n[k]$. The extension towards updating during speech+noise periods with the use of a second, noise only buffer $B_2$ is straightforward: the equations are found by replacing the noise-only input vector y[k] by $y_{buf_2}[k]$ and the speech+noise vector $y_{buf_1}[k]$ by the input speech+noise vector y[k].

It can be shown that the algorithm (eq.51)-(eq.52) is convergent in the mean provided that the step size ρ is smaller than $2/\mu_{max}$ with $\lambda_{max}$ the maximum eigenvalue of $$E\left\{\frac{1}{\mu} y_{buf_1} y_{buf_1}^H + \left(1 - \frac{1}{\mu}\right) yy^H\right\}.$$

The similarity of (eq.51) with standard NLMS let us presume that setting $$\rho < \frac{2}{\sum_i^{NL} \lambda_i},$$

with $\lambda_i$, i=1, . . . , NL the eigenvalues of $$E\left\{\frac{1}{\mu} y_{buf_1} y_{buf_1}^H + \left(1 - \frac{1}{\mu}\right) yy^H\right\} \in R^{NL\times NL},$$

or—in case of FIR filters—setting $$\rho < \frac{2}{\frac{1}{\mu} L \sum_{i=M-N}^{M-1} E\{y_{i,buf_1}^2[k]\} + \left(1 - \frac{1}{\mu}\right) L \sum_{i=M-N}^{M-1} E\{y_i^2[k]\}} \qquad \text{(equation 55)}$$

guarantees convergence in the mean square. Equation (55) explains the normalisation (eq.52) and (eq.54) for the step size ρ.

However, since generally $$y[k]y^H[k] \neq y_{buf_1}^{n}[k]y_{buf_1}^{n,H}[k], \quad \text{(equation 56)}$$

the instantaneous gradient estimate in (eq.51) is—compared to (eq.49)—additionally perturbed by $$\frac{1}{\mu}\left(y[k]y^H[k] - y_{buf_1}^{n}[k]y_{buf_1}^{n,H}[k]\right)w[k], \quad \text{(equation 57)}$$

for 1/μ≠0. Hence, for 1/μ≠0, the update equations (eq.51)-(eq.54) suffer from a larger residual excess error than (eq.49). This additional excess error grows for decreasing μ, increasing step size ρ and increasing vector length LN of the vector y. It is expected to be especially large for highly non-stationary noise, e.g. multi-talker babble noise. Remark that for μ>1, an alternative stochastic gradient algorithm can be derived from algorithm (eq.51)-(eq.54) by invoking some independence assumptions. Simulations, however, showed that these independence assumptions result in a significant performance degradation, while hardly reducing the computational complexity.

Frequency-domain Implementation

As stated before, the stochastic gradient algorithm (eq.51)-(eq.54) is expected to suffer from a large excess error for large ρ'/μ and/or highly time-varying noise, due to a large difference between the rank-one noise correlation matrices $y^n[k]y^{n,H}[k]$ measured at different time instants k. The gradient estimate can be improved by replacing $$y_{buf_1}[k]y_{buf_1}^H[k] - y[k]y^H[k] \quad \text{(equation 58)}$$

in (eq.51) with the time-average $$\frac{1}{K}\sum_{l=k-K+1}^{k} y_{buf_1}[l]y_{buf_1}^H[l] - \frac{1}{K}\sum_{l=k-K+1}^{k} y[l]y^H[l], \quad \text{(equation 59)}$$

where $$\frac{1}{K}\sum_{l=k-K+1}^{k} y_{buf_1}[l]y_{buf_1}^H[l]$$

is updated during periods of speech+noise and $$\frac{1}{K}\sum_{l=k-K+1}^{k} y[l]y^H[l]$$

during periods of noise only. However, this would require expensive matrix operations. A block-based implementation intrinsically performs this averaging:

$$w[(k+1)K] = w[kK] + \frac{\rho}{K}\left[\sum_{i=0}^{K-1} y[kK+i]\left(y_0^*[kK+i-\Delta] - y^H[kK+i]w[kK]\right) - \frac{1}{\mu}\sum_{i=0}^{K-1}\left(y_{buf_1}[kK+i]y_{buf_1}^H[kK+i] - y[kK+i]y^H[kK+i]\right)w[kK]\right]. \quad \text{(equation 60)}$$

The gradient and hence also $y_{buf_1}[k]y_{buf_1}^H[k]-y[k]y^H[k]$ is averaged over K iterations prior to making adjustments to w. This goes at the expense of a reduced (i.e. by a factor K) convergence rate.

The block-based implementation is computationally more efficient when it is implemented in the frequency-domain, especially for large filter lengths: the linear convolutions and correlations can then be efficiently realised by FFT algorithms based on overlap-save or overlap-add. In addition, in a frequency-domain implementation, each frequency bin gets its own step size, resulting in faster convergence compared to a time-domain implementation while not degrading the steady-state excess MSE.

Algorithm 1 summarises a frequency-domain implementation based on overlap-save of (eq.51)-(eq.54). Algorithm 1 requires (3N+4) FFTs of length 2L. By storing the FFT-transformed speech+noise and noise only vectors in the buffers $$B_1 \in C^{N\times L_{buf_1}} \text{ and } B_2 \in C^{N\times L_{buf_2}},$$

respectively, instead of storing the time-domain vectors, N FFT operations can be saved. Note that since the input signals are real, half of the FFT components are complex-conjugated. Hence, in practice only half of the complex FFT components have to be stored in memory. When adapting during speech+noise, also the time-domain vector $$[y_0[kL-\Delta] \ldots y_0[kL-\Delta+L-1]]^T \quad \text{(equation 61)}$$

should be stored in an additional buffer $$B_{2,0} \in R^{1\times\frac{L_{buf_2}}{2}}$$

during periods of noise-only, which—for N=M—results in an additional storage of $$\frac{L_{buf_2}}{2}$$

words compared to when the time-domain vectors are stored into the buffers $B_1$ and $B_2$.

Remark that in Algorithm 1 a common trade-off parameter μ is used in all frequency bins. Alternatively, a different setting for μ can be used in different frequency bins. E.g. for SP-SDW-MWF with $w_0$=0, 1/μ could be set to 0 at those frequencies where the GSC is sufficiently robust, e.g., for small-sized arrays at high frequencies. In that case, only a few frequency components of the regularisation terms $R_i[k]$, i=M−N, . . . , M−1, need to be computed, reducing the computational complexity.

Algorithm 1: Frequency-domain Stochastic Gradient SP-SDW-MWF Based on Overlap-save Initialisation:

$W_i[0]=[0 \ldots 0]^T$, i=M−N, . . . , M−1

$P_m[0]=\delta_m$, m=0, . . . , 2L−1

Matrix definitions:

$$g = \begin{bmatrix} I_L & 0_L \\ 0_L & 0_L \end{bmatrix}; k = [\,0_L \quad I_L\,]; F = 2L \times 2L \text{ DFT matrix;}$$

For each new block of NL input samples:

If noise detected:

1. $F[y_i[kL-L] \ldots y_i[kL+L-1]]^T$, i=M−N, . . . , M−1→noise buffer $B_2$
   $[y_0[kL-\Delta] \ldots y_0[kL-\Delta+L-1]]^T$→noise buffer $B_{2,0}$
2. $Y_i^n[k]=\text{diag}\{F[y_i[kL-L] \ldots y_i[kL+L-1]]^T\}$, i=M−N, . . . , M−1
   $d[k]=[y_0[kL-\Delta] \ldots y_0[kL-\Delta+L-1]]^T$ Create $Y_i[k]$ from data in speech+noise buffer $B_1$.

If speech detected:

1. $F[y_i[kL-L] \ldots y_i[kL+L-1]]^T$, i=M−N, . . . , M−1→speech+noise buffer $B_1$
2. $Y_i[k]=\text{diag}\{F[y_i[kL-L] \ldots y_i[kL+L-1]]^T\}$, i=M−N, . . . , M−1

Create d[k] and $Y_i^n[k]$ from noise buffer $B_{2,0}$ and $B_2$

Update formula:

$$1.\ e_1[k] = kF^{-1}\sum_{j=M-N}^{M-1} Y_j^n[k]W_j[k] = y_{out,1}$$

$$e[k] = d[k] - e_1[k]$$

$$e_2[k] = kF^{-1}\sum_{j=M-N}^{M-1} Y_j[k]W_j[k] = y_{out,2}$$

$$E_1[k] = Fk^T e_1[k];\ E_2[k] = Fk^T e_2[k];\ E[k] = Fk^T e[k]$$

$$2.\ \Lambda[k] = \frac{2\rho'}{L}\,diag\{P_0^{-1}[k], \ldots, P_{2L-1}^{-1}[k]\}$$

$$P_m[k] = \gamma P_m[k-1] + (1-\gamma)\left(\sum_{j=M-N}^{M-1} |Y_{j,m}^n|^2 + \frac{1}{\mu}\left|\sum_{j=M-N}^{M-1} (|Y_{j,m}|^2 - |Y_{j,m}^n|^2)\right|\right)$$

$$3.\ W_i[k+1] = W_i[k] + FgF^{-1}\Lambda[k]\left\{Y_i^{n,H}[k]E[k] - \frac{1}{\mu}(Y_i^H E_2[k] - Y_i^{n,H} E_1[k])\right\},$$

$$(i = M-N, \ldots, M-1)$$

Output: $y_0[k]=[y_0[kL-\Delta] \ldots y_0[kL-\Delta+L-1]]^T$

If noise detected: $y_{out}[k]=y_0[k]-y_{out,1}[k]$

If speech detected: $y_{out}[k]=y_0[k]-y_{out,2}[k]$

Improvement 1: Stochastic Gradient Algorithm with Low Pass Filter

For spectrally stationary noise, the limited (i.e. K=L) averaging of (eq.59) by the block-based and frequency-domain stochastic gradient implementation may offer a reasonable estimate of the short-term speech correlation matrix $E\{y^s y^{s,H}\}$. However, in practical scenarios, the speech and the noise signals are often spectrally highly non-stationary (e.g. multi-talker babble noise) while their long-term spectral and spatial characteristics (e.g. the positions of the sources) usually vary more slowly in time. For these scenarios, a reliable estimate of the long-term speech correlation matrix $E\{y^s y^{s,H}\}$ that captures the spatial rather than the short-term spectral characteristics can still be obtained by averaging (eq.59) over K>>L samples. Spectrally highly non-stationary noise can then still be spatially suppressed by using an estimate of the long-term speech correlation matrix in the regularisation term r[k]. A cheap method to incorporate a long-term averaging (K>>L) of (eq.59) in the stochastic gradient algorithm is now proposed, by low pass filtering the part of the gradient estimate that takes speech distortion into account (i.e. the term r[k] in (eq.51)). The averaging method is first explained for the time-domain algorithm (eq.51)-(eq.54) and then translated to the frequency-domain implementation.

Assume that the long-term spectral and spatial characteristics of the noise are quasi-stationary during at least K speech+noise samples and K noise samples. A reliable estimate of the long-term speech correlation matrix $E\{y^s y^{s,H}\}$ is then obtained by (eq.59) with K>>L. To avoid expensive matrix computations, r[k] can be approximated by $$\frac{1}{K}\sum_{l=k-K+1}^{l=k}\left(y_{buf_1}[l]y_{buf_1}^H[l] - y[l]y^H[l]\right)w[l]. \quad \text{(equation 62)}$$

Since the filter coefficients w of a stochastic gradient algorithm vary slowing in time, (eq.62) appears a good approximation of r[k], especially for small step size ρ'.

The averaging operation (eq.62) is performed by applying a low pass filter to r[k] in (eq. 51):

$$r[k] = \lambda^{\%} r[k-1] + (1-\lambda^{\%})\frac{1}{\mu}\left(y_{buf_1}[k]y_{buf_1}^H[k] - y[k]y^H[k]\right)w[k], \quad \text{(equation 63)}$$

where $\tilde{\lambda}<1$. This corresponds to an averaging window K of about $$\frac{1}{1-\lambda^{\%}}$$

samples. The normalised step size ρ is modified into $$\rho = \frac{\rho'}{r_{avg}[k] + y^H[k]y[k] + \delta} \quad \text{(equation 64)}$$

$$r_{avg}[k] = \lambda^{\%} r_{avg}[k-1] + (1-\lambda^{\%})\frac{1}{\mu}\left|y_{buf_1}^H[k]y_{buf_1}[k] - y^H[k]y[k]\right|. \quad \text{(equation 65)}$$

Compared to (eq.51), (eq.63) requires 3NL−1 additional MAC and extra storage of the NL×1 vector r[k].

Equation (63) can be easily extended to the frequency-domain. The update equation for $W_i[k+1]$ in Algorithm 1 then becomes (Algorithm 2):

$$W_i[k+1] = W_i[k] + FgF^{-1}\Lambda[k](Y_i^{n,H}[k]E[k] - R_i[k]); \quad \text{(equation 66)}$$

$$R_i[k] = \lambda R_i[k-1] + (1-\lambda)\frac{1}{\mu}(Y_i^H[k]E_2[k] - Y_i^{n,H}[k]E_1[k])$$

with $$E[k] = Fk^T\left(y_0^n[k] - kF^{-1}\sum_{j=M-N}^{M-1} Y_j^n[k]W_j[k]\right); \quad \text{(equation 67)}$$

$$E_1[k] = Fk^T kF^{-1}\sum_{j=M-N}^{M-1} Y_j^n[k]W_j[k]; \quad \text{(equation 68)}$$

$$E_2[k] = Fk^T kF^{-1}\sum_{j=M-N}^{M-1} Y_j[k]W_j[k]. \quad \text{(equation 69)}$$

and $\Lambda$ [k] computed as follows:

$$\Lambda[k] = \frac{2\rho'}{L}\operatorname{diag}\{P_0^{-1}[k], \ldots, P_{2L-1}^{-1}[k]\} \quad \text{(equation 70)}$$

$$P_m[k] = \gamma P_m[k-1] + (1-\gamma)(P_{1,m}[k] + P_{2,m}[k]) \quad \text{(equation 71)}$$

$$P_{1,m}[k] = \sum_{j=M-N}^{M-1} |Y_{j,m}^n[k]|^2 \quad \text{(equation 72)}$$

$$P_{2,m}[k] = \lambda P_{2,m}[k-1] + (1-\lambda)\frac{1}{\mu}\left|\sum_{j=M-N}^{M-1}(|Y_{j,m}[k]|^2 - |Y_{j,m}^n[k]|^2)\right|. \quad \text{(equation 73)}$$

Compared to Algorithm 1, (eq.66)-(eq.69) require one extra 2L-point FFT and 8NL-2N-2L extra MAC per L samples and additional memory storage of a 2NL×1 real data vector. To obtain the same time constant in the averaging operation as in the time-domain version with K=1, $\lambda$ should equal $\tilde{\lambda}^L$. The experimental results that follow will show that the performance of the stochastic gradient algorithm is significantly improved by the low pass filter, especially for large $\lambda$.

Now the computational complexity of the different stochastic gradient algorithms is discussed. Table 1 summarises the computational complexity (expressed as the number of real multiply-accumulates (MAC), divisions (D), square roots (Sq) and absolute values (Abs)) of the time-domain (TD) and the frequency-domain (FD) Stochastic Gradient (SG) based algorithms. Comparison is made with standard NLMS and the NLMS based SPA. One complex multiplication is assumed to be equivalent to 4 real multiplications and 2 real additions. A 2L-point FFT of a real input vector requires $2L\log_2 2L$ real MAC (assuming a radix-2 FFT algorithm).

Table 1 indicates that the TD-SG algorithm without filter $w_0$ and the SPA are about twice as complex as the standard ANC. When applying a Low Pass filter (LP) to the regularisation term, the TD-SG algorithm has about three times the complexity of the ANC. The increase in complexity of the frequency-domain implementations is less.

TABLE 1

| | Algorithm | update formula | step size adaptation |
|---|---|---|---|
| TD | NLMS ANC | (2M − 2)L + 1)MAC | 1D + (M − 1)LMAC |
| | NLMS based SPA | (4(M − 1)L + 1) MAC + 1D + 1 Sq | 1D + (M − 1)LMAC |
| | SG | (4NL + 5) MAC | 1D + 1Abs + (2NL + 2)MAC |
| | SG with LP | (7NL + 4)MAC | 1D + 1Abs + (2NL + 4)MAC |
| FD | NLMS ANC | $\left(10M - 7 - \frac{4(M-1)}{L}\right)$ + (6M − 2)$\log_2$2L MAC | 1D + (2M + 2)MAC |
| | NLMS based SPA | $14M - 11 - \frac{4(M-1)}{L}$ + (6M − 2)$\log_2$2L MAC + 1/L Sq + 1/LD | 1D + (2M + 2)MAC |
| | SG (Algorithm 1) | $\left(18N + 6 - \frac{8N}{L}\right)$ + (6N + 8)$\log_2$2L MAC | 1D + 1Abs + (4N + 4)MAC |
| | SG with LP (Algorithm 2) | $\left(26N + 4 - \frac{10N}{L}\right)$ + (6N + 10)$\log_2$2L MAC | 1D + 1Abs + (4N + 6)MAC |

Figure 9:
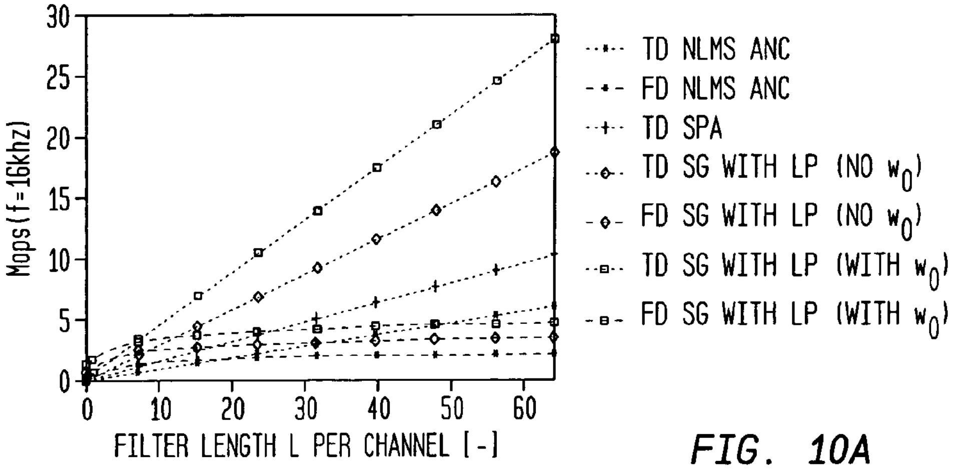
FIG. 9 represents the complexity of TD and FD Stochastic Gradient (SG) algorithm with LP filter as a function of filter length L per channel; M=3 (for comparison, the complexity of the standard NLMS ANC and SPA are depicted too) in accordance with one embodiment of the present invention.

As an illustration, FIG. 9 plots the complexity (expressed as the number of Mega operations per second (Mops)) of the time-domain and the frequency-domain stochastic gradient algorithm with LP filter as a function of L for M=3 and a sampling frequency $f_s$=16 kHz. Comparison is made with the NLMS-based ANC of the GSC and the SPA. The complexity of the FD SPA is not depicted, since for small M, it is comparable to the cost of the FD-NLMS ANC. For L>8, the frequency-domain implementations result in a significantly lower complexity compared to their time-domain equivalents. The computational complexity of the FD stochastic gradient algorithm with LP is limited, making it a good alternative to the SPA for implementation in hearing aids.

In Table 1 and FIG. 9 the complexity of the time-domain and the frequency-domain NLMS ANC and NLMS based SPA represents the complexity when the adaptive filter is only updated during noise only. If the adaptive filter is also updated during speech+noise using data from a noise buffer, the time-domain implementations additionally require NL MAC per sample and the frequency-domain implementations additionally require 2 FFT and (4L(M−1)−2(M−1)+L) MAC per L samples.

The performance of the different FD stochastic gradient implementations of the SP-SDW-MWF is evaluated based on experimental results for a hearing aid application. Comparison is made with the FD-NLMS based SPA. For a fair comparison, the FD-NLMS based SPA is—like the stochastic gradient algorithms—also adapted during speech+noise using data from a noise buffer.

The set-up is the same as described before (see also FIG. 5). The performance of the FD stochastic gradient algorithms is evaluated for a filter length L=32 taps per channel, ρ'=0.8 and γ=0. To exclude the effect of the spatial pre-processor, the performance measures are calculated w.r.t. the output of the fixed beamformer. The sensitivity of the algorithms against errors in the assumed signal model is illustrated for microphone mismatch, e.g. a gain mismatch $Y_2$=4 dB of the second microphone.

Figure 10A:
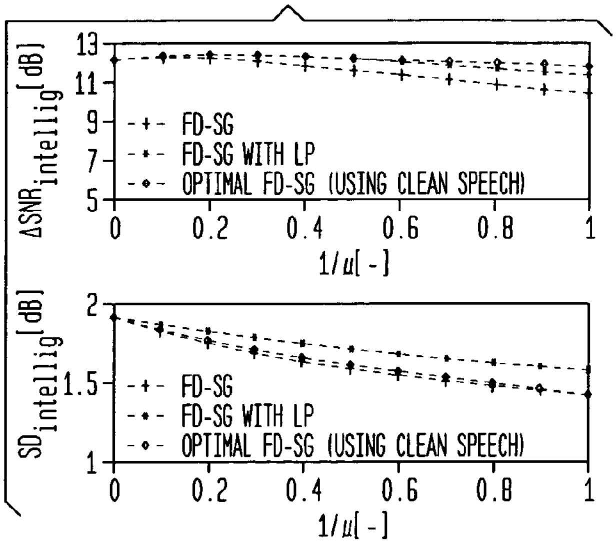
FIG. 10 represents the performance of different FD Stochastic Gradient (FD-SG) algorithms; (a) Stationary speech-like noise at 90°; (b) Multi-talker babble noise at 90° in accordance with one embodiment of the present invention.
Figure 10B:
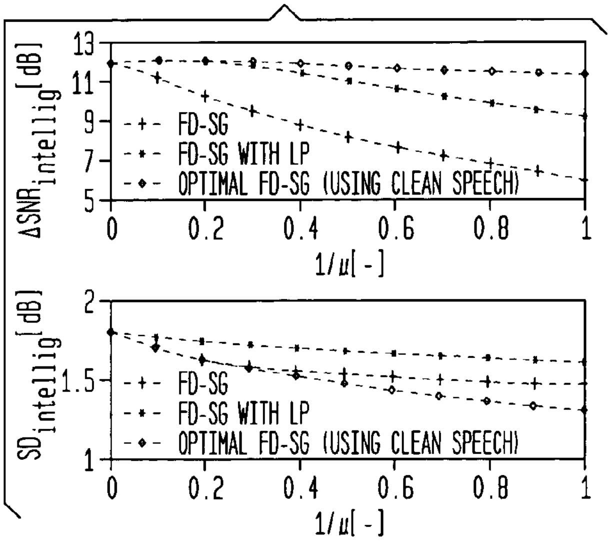

FIG. 10(*a*) and (*b*) compare the performance of the different FD Stochastic Gradient (SG) SP-SDW-MWF algorithms without $w_0$ (i.e., the SDR-GSC) as a function of the trade-off parameter μ for a stationary and a non-stationary (e.g. multi-talker babble) noise source, respectively, at 90°. To analyse the impact of the approximation (eq.50) on the performance, the result of a FD implementation of (eq.49), which uses the clean speech, is depicted too. This algorithm is referred to as optimal FD-SG algorithm. Without Low Pass (LP) filter, the stochastic gradient algorithm achieves a worse performance than the optimal FD-SG algorithm (eq.49), especially for large 1/μ. For a stationary speech-like noise source, the FD-SG algorithm does not suffer too much from approximation (eq.50). In a highly time-varying noise scenario, such as multi-talker babble, the limited averaging of r[k] in the FD implementation does not suffice to maintain the large noise reduction achieved by (eq.49). The loss in noise reduction performance could be reduced by decreasing the step size ρ', at the expense of a reduced convergence speed. Applying the low pass filter (eq.66) with e.g. λ=0.999 significantly improves the performance for all 1/μ while changes in the noise scenario can still be tracked.

Figure 11:
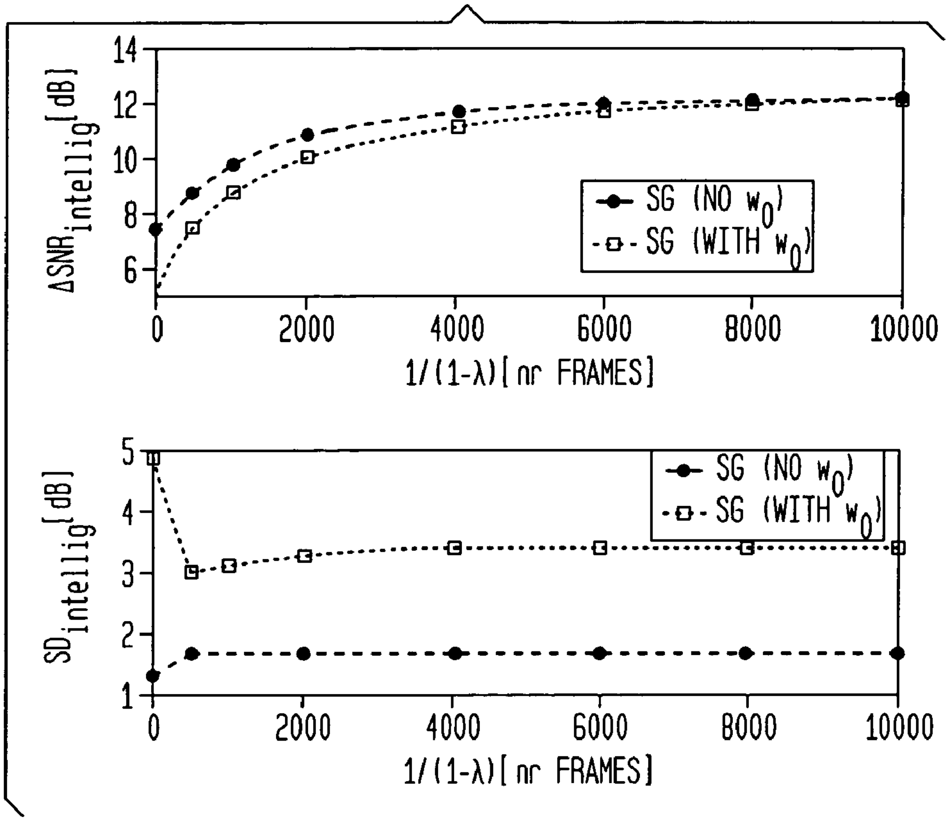
FIG. 11 represents the influence of the LP filter on performance of FD stochastic gradient SP-SDW-MWF ($1/\mu$=0.5) without $w_0$ and with $w_0$. Babble noise at 90° in accordance with one embodiment of the present invention.

FIG. 11 plots the SNR improvement $\Delta SNR_{intellig}$ and the speech distortion $SD_{intellig}$ of the SP-SDW-MWF (1/μ=0.5) with and without filter $w_0$ for the babble noise scenario as a function of $$\frac{1}{1-\lambda}$$

where λ is the exponential weighting factor of the LP filter (see (eq.66)). Performance clearly improves for increasing λ. For small λ, the SP-SDW-MWF with $w_0$ suffers from a larger excess error—and hence worse $\Delta SNR_{intellig}$—compared to the SP-SDW-MWF without $w_0$. This is due to the larger dimensions of $E\{y^s y^{s,H}\}$.

Figure 12:
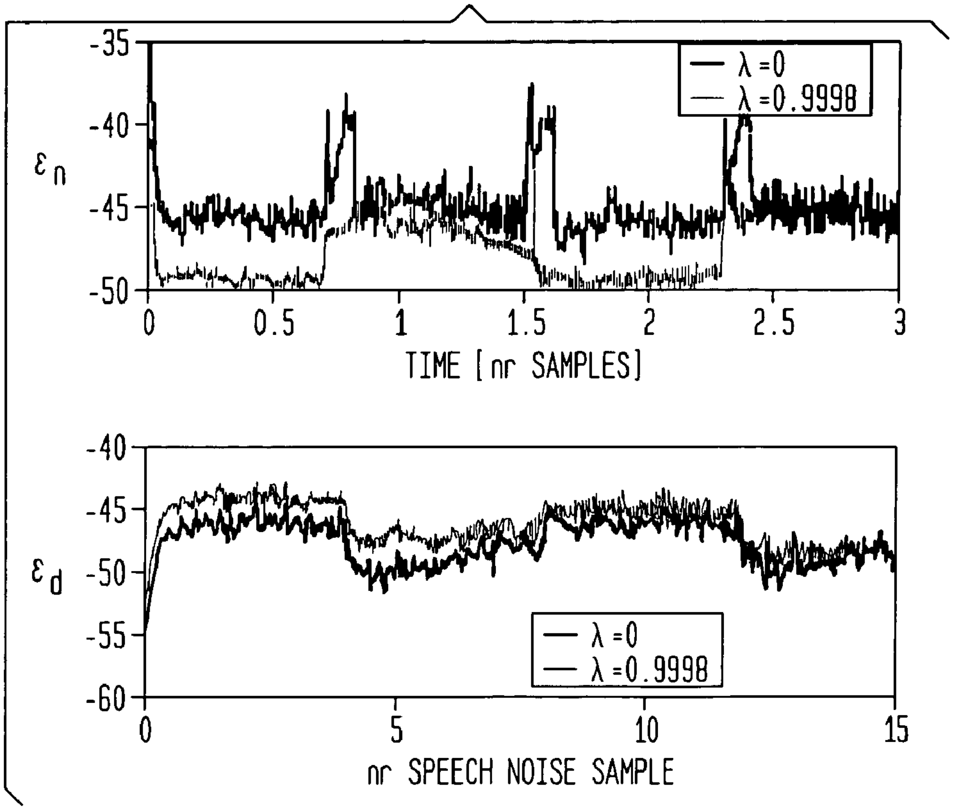
FIG. 12 represents the convergence behaviour of FD-SG for $\lambda$=0 and $\lambda$=0.9998. The noise source position suddenly changes from 90° to 180° and vice versa in accordance with one embodiment of the present invention.

The LP filter reduces fluctuations in the filter weights $W_i[k]$ caused by poor estimates of the short-term speech correlation matrix $E\{y^s y^{s,H}\}$ and/or by the highly non-stationary short-term speech spectrum. In contrast to a decrease in step size ρ', the LP filter does not compromise tracking of changes in the noise scenario. As an illustration, FIG. 12 plots the convergence behaviour of the FD stochastic gradient algorithm without $w_0$ (i.e. the SDR-GSC) for λ=0 and λ=0.9998, respectively, when the noise source position suddenly changes from 90° to 180°. A gain mismatch $Y_2$ of 4 dB was applied to the second microphone. To avoid fast fluctuations in the residual noise energy $\epsilon_n^2$ and the speech distortion energy $\epsilon_d^2$, the desired and the interfering noise source in this experiment are stationary, speech-like. The upper figure depicts the residual noise energy $\epsilon_n^2$ as a function of the number of input samples, the lower figure plots the residual speech distortion $\epsilon_d^2$ during speech+noise periods as a function of the number of speech+noise samples. Both algorithms (i.e., λ=0 and λ=0.9998) have about the same convergence rate. When the change in position occurs, the algorithm with λ=0.9998 even converges faster. For λ=0, the approximation error (eq.50) remains large for a while since the noise vectors in the buffer are not up to date. For λ=0.9998, the impact of the instantaneous large approximation error is reduced thanks to the low pass filter.

Figure 13:
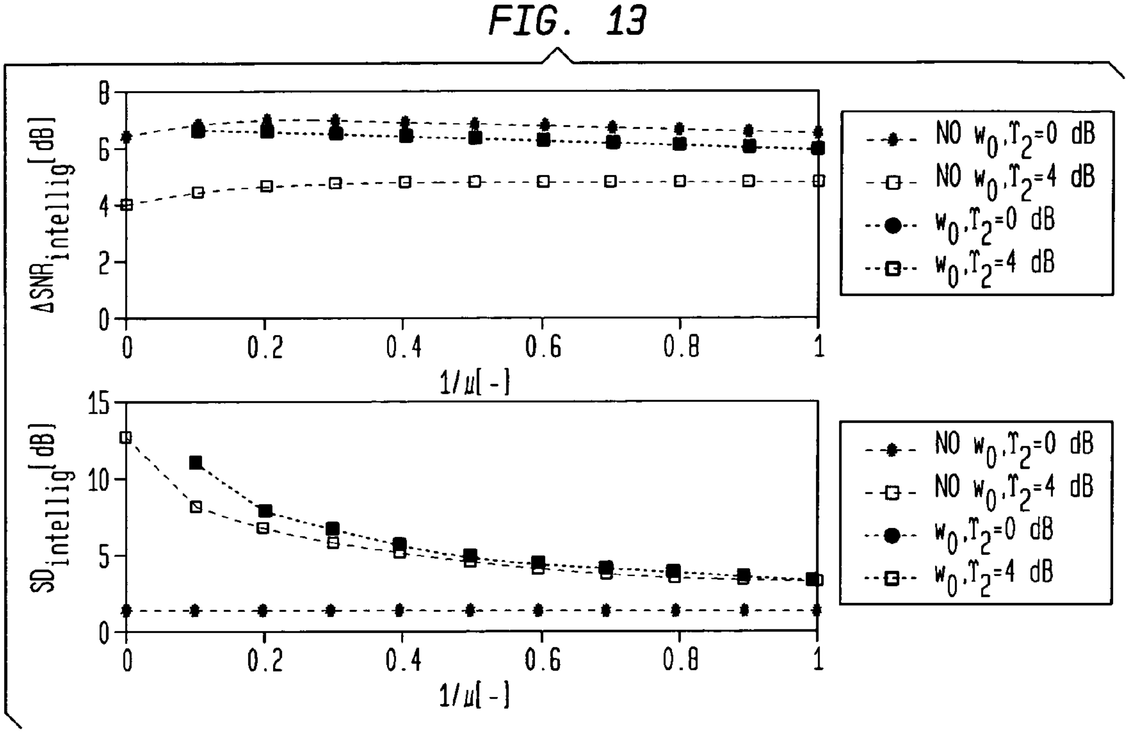
FIG. 13 represents the performance of FD stochastic gradient implementation of SP-SDW-MWF with LP filter ($\lambda$=0.9998) in a multiple noise source scenario in accordance with one embodiment of the present invention.
Figure 14:
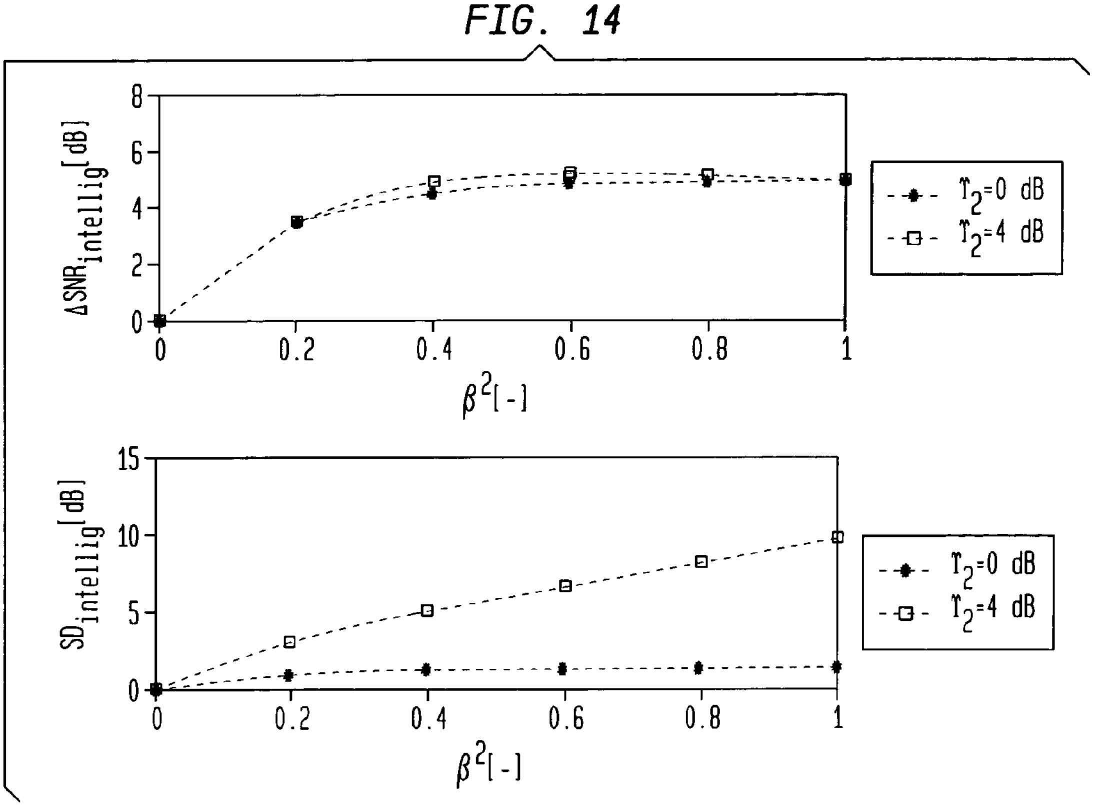
FIG. 14 represents the performance of FD SPA in a multiple noise source scenario in accordance with one embodiment of the present invention.

FIG. 13 and FIG. 14 compare the performance of the FD stochastic gradient algorithm with LP filter (λ=0.9998) and the FD-NLMS based SPA in a multiple noise source scenario. The noise scenario consists of 5 multi-talker babble noise sources positioned at angles 75°,120°,180°,240°,285° w.r.t. the desired source at 0°. To assess the sensitivity of the algorithms against errors in the assumed signal model, the influence of microphone mismatch, i.e. gain mismatch $Y_2$=4 dB of the second microphone, on the performance is depicted too. In FIG. 13, the SNR improvement $\Delta SNR_{intellig}$ and the speech distortion $SD_{intellig}$ of the SP-SDW-MWF with and without filter $w_0$ is depicted as a function of the trade-off parameter 1/μ. FIG. 14 shows the performance of the QIC-GSC $$w^H w \leqq \beta^2 \qquad \text{(equation 74)}$$

for different constraint values $\beta^2$, which is implemented using the FD-NLMS based SPA. The SPA and the stochastic gradient based SP-SDW-MWF both increase the robustness of the GSC (i.e., the SP-SDW-MWF without $w_0$ and 1/μ=0). For a given maximum allowable speech distortion $SD_{intellig}$, the SP-SDW-MWF with and without $w_0$ achieve a better noise reduction performance than the SPA. The performance of the SP-SDW-MWF with $w_0$ is—in contrast to the SP-SDW-MWF without $w_0$—not affected by microphone mismatch. In the absence of model errors, the SP-SDW-MWF with $w_0$ achieves a slightly worse performance than the SP-SDW-MWF without $w_0$. This can be explained by the fact that with $w_0$, the estimate of $$\frac{1}{\mu}E\{y^s y^{s,H}\}$$

is less accurate due to the larger dimensions of $$\frac{1}{\mu}E\{y^s y^{s,H}\}$$

(see also FIG. 11). In conclusion, the proposed stochastic gradient implementation of the SP-SDW-MWF preserves the benefit of the SP-SDW-MWF over the QIC-GSC.

Improvement 2: Frequency-domain Stochastic Gradient Algorithm Using Correlation Matrices It is now shown that by approximating the regularisation term in the frequency-domain, (diagonal) speech and noise correlation matrices can be used instead of data buffers, such that the memory usage is decreased drastically, while also the computational complexity is further reduced. Experimental results demonstrate that this approximation results in a small—positive or negative—performance difference compared to the stochastic gradient algorithm with low pass filter, such that the proposed algorithm preserves the robustness benefit of the SP-SDW-MWF over the QIC-GSC, while both its computational complexity and memory usage are now comparable to the NLMS-based SPA for implementing the QIC-GSC.

As the estimate of r[k] in (eq.51) provided to be quite poor, resulting in a large excess error, it was suggested in (eq. 59) to use an estimate of the average clean speech correlation matrix. This allows r[k] to be computed as $$r[k] = \frac{1}{\mu}(1-\tilde{\lambda})\sum_{l=0}^{k}\left(y_{buf_1}[l]y_{buf_1}^{H}[l] - y^{n}[l]y^{n,H}[l]\right)\cdot w[k], \quad \text{(equation 75)}$$

with $\tilde{\lambda}$ an exponential weighting factor. For stationary noise a small $\tilde{\lambda}$, i.e. $1/(1-\tilde{\lambda})\sim NL$, suffices. However, in practice the speech and the noise signals are often spectrally highly non-stationary (e.g. multi-talker babble noise), whereas their long-term spectral and spatial characteristics usually vary more slowly in time. Spectrally highly non-stationary noise can still be spatially suppressed by using an estimate of the long-term correlation matrix in r[k], i.e. $1/(1-\tilde{\lambda})>>NL$. In order to avoid expensive matrix operations for computing (eq.75), it was previously assumed with w[k] varies slowly in time, i.e. $w[k]\approx w[1]$, such that (eq.75) can be approximated with vector instead of matrix operations by directly applying a low pass filter to the regularisation term r[k], cf. (eq. 63), $$r[k] = \frac{1}{\mu}\left(1-\tilde{\lambda}\right)\sum_{l=0}^{k}\tilde{\lambda}^{k-l}\left(y_{buf_1}[l]y_{buf_l}^{H}[l] - y^{n}[l]y^{n,H}[l]\right)\cdot w[l] \quad \text{(equation 76)}$$

$$= \lambda r[k-1] + (1-\lambda)\frac{1}{\mu}\left(y_{buf_1}[k] - y_{bif_1}^{H}[k] - y^{n}[k]y^{n,H}[k]\right)w[k]. \quad \text{(equation 77)}$$

However, this assumption is actually not required in a frequency-domain implementation, as will now be shown.

The frequency-domain algorithm called Algorithm 2 requires large data buffers and hence the storage of a large amount of data (note that to achieve a good performance, typical values for the buffer lengths of the circular buffers $B_1$ and $B_2$ are 10000 . . . 20000). A substantial memory (and computational complexity) reduction can be achieved by the following two steps:

- When using (eq.75) instead of (eq.77) for calculating the regularisation term, correlation matrices instead of data samples need to be stored. The frequency-domain implementation of the resulting algorithm is summarised in Algorithm 3, where 2L×2L-dimensional speech and noise correlation matrices $S_{ij}[k]$ and $S_{ij}^{n}[k]$, i, j=M−N . . . M−1 are used for calculating the regularisation term $R_i[k]$ and (part of) the step size $\Lambda[k]$. These correlation matrices are updated respectively during speech+noise periods and noise only periods. When using correlation matrices, filter adaptation can only take place during noise only periods, since during speech+noise periods the desired signal cannot be constructed from the noise buffer $B_2$ anymore. This first step however does not necessarily reduce the memory usage ($NL_{bufl}$ for data buffers vs. $2(NL)^2$ for correlation matrices) and will even increase the computational complexity, since the correlation matrices are not diagonal.
- The correlation matrices in the frequency-domain can be approximated by diagonal matrices, since $Fk^{T}kF^{-1}$ in Algorithm 3 can be well approximated by $I_{2L}/2$. Hence the speech and the noise correlation matrices are updated as $$S_{ij}[k]=\lambda S_{ij}[k-1]+(1-\lambda)Y_i^{H}[k]Y_j[k]/2, \quad \text{(equation 78)}$$

$$S_{ij}^{n}[k]=\lambda S_{ij}^{n}[k-1]+(1-\lambda)Y_i^{n,H}[k]Y_j^{n}[k]/2, \quad \text{(equation 79)}$$

leading to a significant reduction in memory usage and computational complexity, while having a minimal impact on the performance and the robustness. This algorithm will be referred to as Algorithm 4.

Algorithm 3 Frequency-domain Implementation with Correlation Matrices (Without Approximation)

Initialisation and matrix definitions:

$W_i[0]=[0 \ldots 0]^T$, i=M−N . . . M−1

$P_m[0]=\delta_m$, m=0 . . . 2L−1

F=2L×2L-dimensional DFT matrix $$g = \begin{bmatrix} I_L & 0_L \\ 0_L & 0_L \end{bmatrix},$$

$$k = [\,0_L \quad I_L\,]$$

$0_L$=L×L-dim. zero matrix, $I_L$=L×L-dim. identity matrix

For each new block of L samples (per channel):

$$d[k]=[y_0[kL-\Delta] \ldots y_0[kL-\Delta+L-1]]^T$$

$$Y_i[k]=\text{diag}\ \{F[y_i[kL-L] \ \ldots \ y_i[kL+L-1]]^T\},\ i=M-N \ldots M-1$$

Output signal:

$$e[k] = d[k] - kF^{-1}\sum_{j=M-N}^{M-1} Y_j[k]W_j[k],$$

$$E[k] = Fk^{T}e[k]$$

If speech detected:

$$S_{ij}[k] = (1-\lambda)\sum_{l=0}^{k}\lambda^{k-l}Y_i^{H}[l]Fk^{T}kF^{-1}Y_j[l]$$

$$= \lambda S_{ij}[k-1] + (1-\lambda)Y_i^{H}[k]Fk^{T}kF^{-1}Y_j[k]$$

If noise detected: $Y_i[k]=Y_i^{n}[k]$ $$S_{ij}^{n}[k] = (1-\lambda)\sum_{l=0}^{k}\lambda^{k-l}Y_l^{n,H}[l]Fk^{T}kF^{-1}Y_j^{n}[l]$$

$$= \lambda S_{ij}^{n}[k-1] + (1-\lambda)Y_i^{n,H}[k]Fk^{T}kF^{-1}Y_j^{n}[k]$$

Update formula (only during noise-only-periods):

$$R_i[k] = \frac{1}{\mu}\sum_{j=M-N}^{M-1}[S_{ij}[k] - S_{ij}^{n}[k]]W_j[k],$$

$$i = M-N \ldots M-1$$

$$W_i[k+1] = W_i[k] + FgF^{-1}\Lambda[k]\{Y_i^{n,H}[k]E[k] - R_i[k]\},$$

$$i = M-N \ldots, M-1$$

with $$\Lambda[k] = \frac{2\rho'}{L}diag\{P_0^{-1}[k], \ldots, P_{2L-1}^{-1}[k]\}$$

-continued $$P_m[k] = \gamma P_m[k-1] + (1-\gamma)(P_{1,m}[k] + P_{2,m}[k]),$$

$$m = 0 \ldots 2L-1$$

$$P_{1,m}[k] = \sum_{j=M-N}^{M-1} |Y^n_{j,m}[k]|^2,$$

$$P_{2,m}[k] = \frac{1}{\mu}\left|\sum_{j=M-N}^{M-1} S_{jj,m}[k] - S^n_{jj,m}[k]\right|,$$

$$m = 0 \ldots 2L-1$$

$$P_{1,m}[k] = \sum_{j=M-N}^{M-1} |Y^n_{j,m}[k]|^2,\ P_{2,m}[k] =$$

The computational complexity of the SP-SDW-MWF (Algorithm 2) with filter $w_0$ is about twice the complexity of the QIC-GSC (and even less if the filter $w_0$ is not used). The approximation of the regularisation term in Algorithm 4 further reduces the computational complexity. However, this only remains true for a small number of input channels, since the approximation introduces a quadratic term $O(N^2)$.

Due to the storage of data samples in the circular speech+noise buffer $B_1$, the memory usage of the SP-SDW-MWF (Algorithm 2) is quite high in comparison with the QIC-GSC (depending on the size of the data buffer $L_{buf1}$ of course). By using the approximation of the regularisation term in Algorithm 4, the memory usage can be reduced drastically, since now diagonal correlation matrices instead of data buffers need to be stored. Note however that also for the memory usage a quadratic term $O(N^2)$ is present.

TABLE 2

| Algorithm | Computational complexity: update formula | Computational complexity: step size adaptation | Mops |
|---|---|---|---|
| NLMS based SPA | $\left(14M - 11 - \frac{4(M-1)}{L} + (6M-2)\log_2 2L\,\text{MAC} + 1/L\ \text{Sq} + 1/L\text{D}\right.$ | (2M + 2)MAC + 1D | 2.16 |
| SG with LP (Algorithm 2) | $\left(26N + 4 - \frac{10N}{L}\right) + (6N+10)\log_2 2L\,\text{MAC}$ | (4N + 6)MAC + 1D + 1Abs | 3.22$^{(a)}$, 4.27$^{(b)}$ |
| SG with correlation matrices (Algorithm 4) | $\left(10N^2 + 13N - \frac{4N^2+3N}{L}\right) + (6N+4)\log_2 2L\text{MAC}$ | (2N + 4)MAC + 1D + 1Abs | 2.71$^{(a)}$, 4.31$^{(b)}$ |
| | Memory usage | | kWords |
| NLMS based SPA | 4(M − 1)L + 6L | | 0.45 |
| SG with LP (Algorithm 2) | $2NL_{buf1} + 6LN + 7L$ | | 40.61$^{(a)}$, 60.80$^{(b)}$ |
| SG with correlation matrices (Algorithm 4) | $4LN^2 + 6LN + 7L$ | | 1.12$^{(a)}$, 1.95$^{(b)}$ |

-continued $$\frac{1}{\mu}\left|\sum_{j=M-N}^{M-1} S_{jj,m}[k] - S^n_{jj,m}[k]\right|,\ m = 0 \ldots 2L-1$$

Table 2 summarises the computational complexity and the memory usage of the frequency-domain NLMS-based SPA for implementing the QIC-GSC and the frequency-domain stochastic gradient algorithms for implementing the SP-SDW-MWF (Algorithm 2 and Algorithm 4). The computational complexity is again expressed as the number of Mega operations per second (Mops), while the memory usage is expressed in kWords. The following parameters have been used: M=3, L=32, $f_s$=16 kHz, $L_{buf1}$=10000, (a) N=M−1, (b) N=M. From this table the following conclusions can be drawn:

It is now shown that practically no performance difference exists between Algorithm 2 and Algorithm 4, such that the SP-SDW-MWF using the implementation with (diagonal) correlation matrices still preserves its robustness benefit over the GSC (and the QIC-GSC). The same set-up has been used as for the previous experiments.

The performance of the stochastic gradient algorithms in the frequency-domain is evaluated for a filter length L=32 per channel, ρ'=0.8, γ=0.95 and λ=0.9998. For all considered algorithms, filter adaptation only takes place during noise only periods. To exclude the effect of the spatial pre-processor, the performance measures are calculated with respect to the output of the fixed beamformer. The sensitivity of the algorithms against errors in the assumed signal model is illustrated for microphone mismatch, i.e. a gain mismatch $Y_2$=4 dB at the second microphone.

Figure 15:
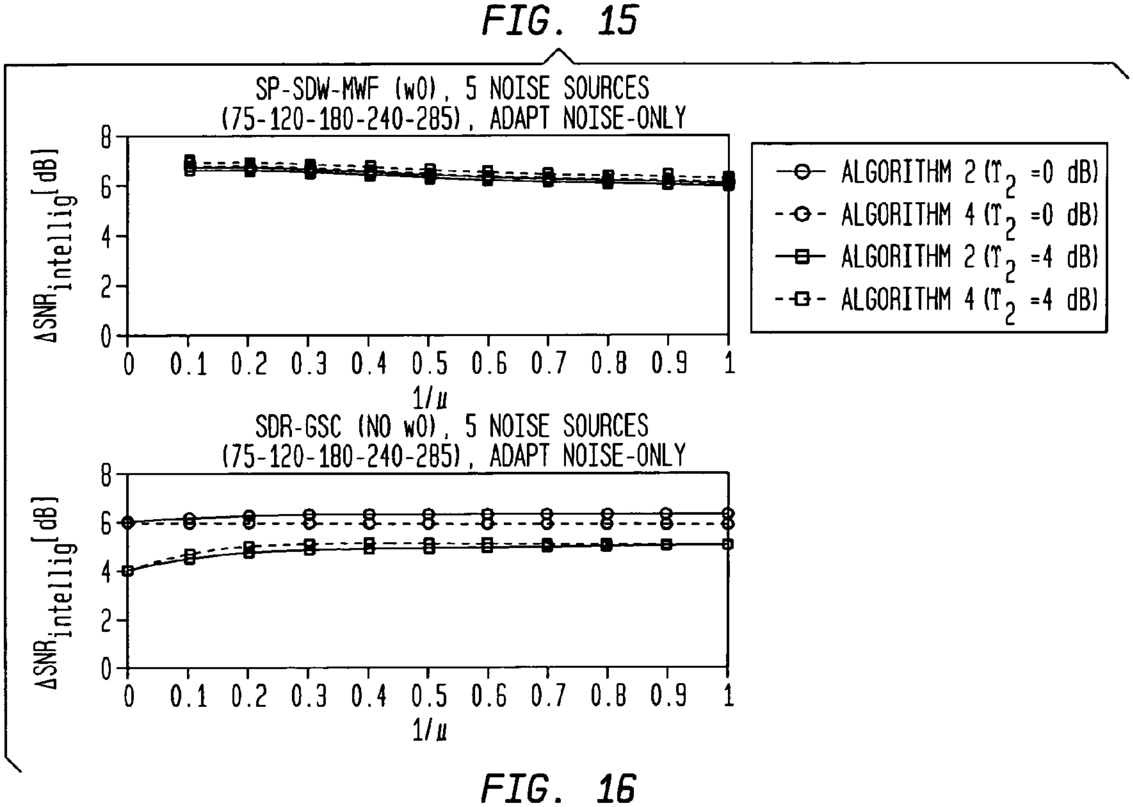
FIG. 15 represents the SNR improvement of the frequency-domain SP-SDW-MWF (Algorithm 2 and Algorithm 4) in a multiple noise source scenario in accordance with one embodiment of the present invention.
Figure 16:
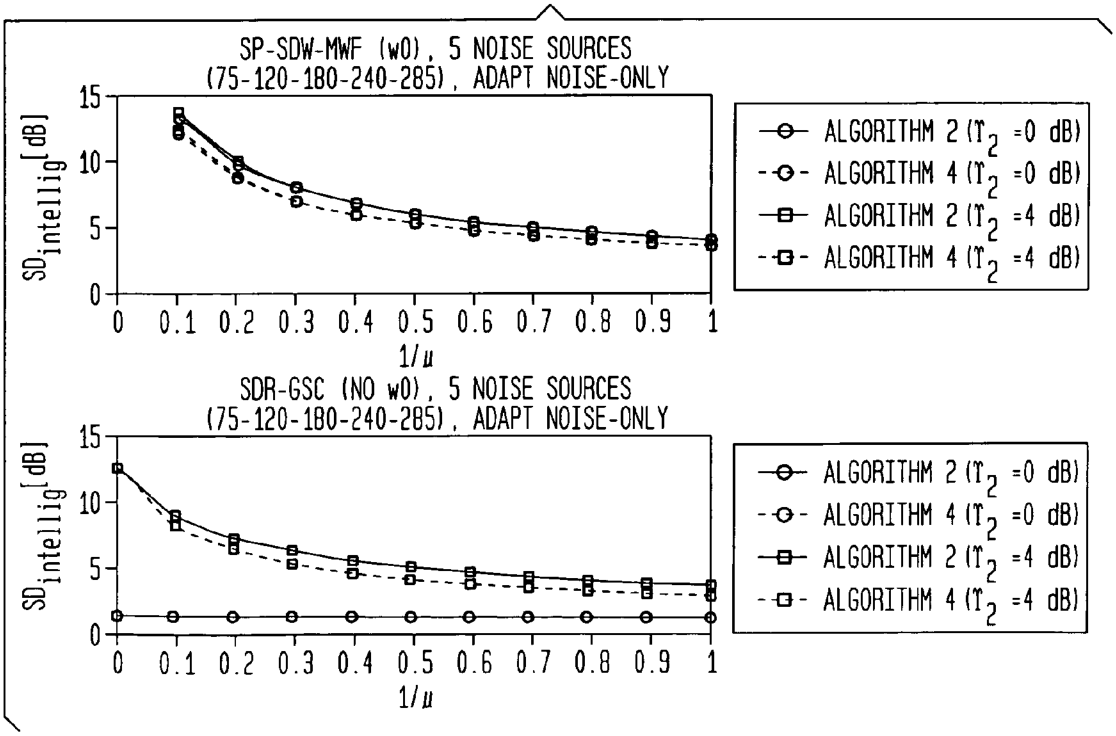
FIG. 16 represents the speech distortion of the frequency-domain SP-SDW-MWF (Algorithm 2 and Algorithm 4) in a multiple noise source scenario in accordance with one embodiment of the present invention.

FIG. 15 and FIG. 16 depict the SNR improvement $\Delta SNR_{intellig}$ and the speech distortion $SD_{intellig}$ of the SP-SDW-MWF (with $w_0$) and the SDR-GSC (without $w_0$), implemented using Algorithm 2 (solid line) and Algorithm 4 (dashed line), as a function of the trade-off parameter $1/\mu$. These figures also depict the effect of a gain mismatch $Y_2=4$ dB at the second microphone. From these figures it can be observed that approximating the regularisation term in the frequency-domain only results in a small performance difference. For most scenarios the performance is even better (i.e. larger SNR improvement and smaller speech distortion) for Algorithm 4 than for Algorithm 2.

Hence, also when implementing the SP-SDW-MWF using the proposed Algorithm 4, it still preserves its robustness benefit over the GSC (and the QIC-GSC). E.g. it can be observed that the GSC (i.e. SDR-GSC with $1/\mu=0$) will result in a large speech distortion (and a smaller SNR improvement) when microphone mismatch occurs. Both the SDR-GSC and the SP-SDW-MWF add robustness to the GSC, i.e. the distortion decreases for increasing $1/\mu$. The performance of the SP-SDW-MWF (with $w_0$) is again hardly affected by microphone mismatch.

The invention claimed is:

1. A method of reducing noise in a speech signal, comprising:

receiving at least two versions of said speech signal at a first filter;

outputting by said first filter a speech reference signal comprising a desired signal and a noise contribution, and at least one noise reference signal comprising a speech leakage contribution and a noise contribution;

applying a filtering operation to said at least one noise reference signal; and subtracting from said speech reference signal said filtered at least one noise reference signal to provide an output version of said speech signal having reduced noise therein, whereby said filtering operation of said at least one noise reference signal is performed with one or more filters having filter coefficients configured to minimize a weighted sum of the speech distortion energy and the residual noise energy in said output version of said speech signal, said speech distortion energy being the energy of said speech leakage contributions and said residual noise energy being the energy of said noise contribution in said speech reference signal and in said at least one noise reference signal.

2. The method of claim 1, wherein at least two microphones are provided, and wherein the method further comprises:

receiving said speech signal at said at least two microphones; and providing to said first filter a version of said speech signal from each of said at least two microphones.

3. The method of claim 1, wherein said first filter is a spatial pre-processor filter comprising:

a beamformer filter; and a blocking matrix filter.

4. The method of claim 3, further comprising:

outputting by said beamformer filter said speech reference signal; and outputting by said blocking matrix filter said at least one noise reference signal.

5. The method of claim 1, further comprising:

delaying said speech reference signal before performing said subtraction of said filtered at least one noise reference signal from said speech reference signal.

6. The method of claim 1, further comprising:

applying a filtering operation to said speech reference signal; and subtracting said filtered speech reference signal and said at least one noise reference signal from said speech reference signal to provide said output version of said speech signal.

7. The method of claim 1, further comprising:

adapting said filter coefficients so as to take in to account one or more of said speech leakage contribution signal and said desired signal.

8. A signal processor for reducing noise in a speech signal, comprising:

a first filter configured to receive two versions of said speech signal, and to output a speech reference signal and at least one noise reference signal, wherein said speech reference signal comprises a desired signal and a noise contribution, and wherein said at least one noise reference signal comprises a speech leakage contribution and a noise contribution;

a second filter configured to filter said at least one noise reference signal; and a summer configured to subtract said at least one filtered noise reference signal from said speech reference signal to provide an output version of said speech signal having reduced noise therein, wherein said second filter has filter coefficients configured to minimize a weighted sum of the energy of said speech leakage contribution and the energy of said noise contributions in said output version of said speech signal.

9. The signal processor of claim 8, wherein said first filter is a spatial pre-processor filter comprising:

a beamformer filter; and a blocking matrix filter.

10. The signal processor of claim 9, wherein said beamformer filter is a delay-and-sum beamformer.

11. The signal processor of claim 8, wherein said signal processor is implemented in a prosthetic hearing device.

12. The signal processor of claim 8, wherein said second filter is further configured to filter said speech reference signal, and wherein said summer is configured to subtract said filtered speech reference signal and said at least one filtered noise reference signal from said speech reference signal to provide said output version of said speech signal.

13. The signal processor of claim 8, wherein said filter coefficients are adaptive so as to take in to account one or more of said speech leakage contribution and said desired signal.

14. A signal processor configured to reduce noise in a speech signal, comprising:

means for filtering at least two versions of said speech signal, said filtering means configured to output a speech reference signal comprising a desired signal and a noise contribution, and at least one noise reference signal comprising a speech leakage contribution and a noise contribution;

means for filtering said at least one noise reference signal; and means for subtracting said at least one filtered noise reference signal from said speech reference signal so as to output a version of said speech signal having reduced noise therein, wherein said means for filtering said at least one noise reference signal is configured to minimize a weighted sum of the energy of said speech leakage contribution and the energy of said noise contributions in said output version of said speech signal.

15. The signal processor of claim 14, wherein said means for filtering said at least two versions of said speech signal is a spatial pre-processor filter comprising:

a beamformer filter; and a blocking matrix filter.

16. The signal processor of claim 15, wherein said speech reference signal is output by said beamformer filter, and wherein said at least one noise reference signal is output by said blocking matrix filter.

17. The signal processor of claim 14, further comprising:

means for delaying said speech reference signal before performing said subtraction of said at least one filtered noise reference signal from said speech reference signal.

18. The signal processor of claim 14, further comprising:

means for filtering said speech reference signal; and means for subtracting said filtered speech reference signal and said at least one noise reference signal from said speech reference signal to provide said output version of said speech signal.

19. The signal processor of claim 14, further comprising:

means for adapting said filtering of said noise reference signal so as to take in to account one or more of said speech leakage contribution and said desired signal.

* * * * *